(12) United States Patent
Lau et al.

(10) Patent No.: US 9,530,160 B2
(45) Date of Patent: Dec. 27, 2016

(54) SYSTEM AND METHOD FOR AN AFFINITY CAPTURE, USER FEEDBACK AND AFFINITY ANALYSIS

(71) Applicant: Nanigans, Inc., Boston, MA (US)

(72) Inventors: Andrew Man-Hon Lau, Cambridge, MA (US); Joseph Taisup Chung, Cambridge, MA (US); David Andrew Joy, Somerville, MA (US); Kwan Hong Lee, Cambridge, MA (US); Aatish Dilip Salvi, Somerville, MA (US)

(73) Assignee: Nanigans, Inc., Boston, MA (US)

(*) Notice: Subject to any disclaimer, the term of this patent is extended or adjusted under 35 U.S.C. 154(b) by 0 days.

(21) Appl. No.: 14/209,121

(22) Filed: Mar. 13, 2014

(65) Prior Publication Data

US 2014/0279130 A1    Sep. 18, 2014

Related U.S. Application Data

(60) Provisional application No. 61/783,155, filed on Mar. 14, 2013.

(51) Int. Cl.
| | | |
|---|---|---|
| *G06Q 30/06* | (2012.01) | |
| *G06Q 50/00* | (2012.01) | |
| *G06Q 30/02* | (2012.01) | |

(52) U.S. Cl.
CPC ...... *G06Q 30/0603* (2013.01); *G06Q 30/0201* (2013.01); *G06Q 30/0207* (2013.01); *G06Q 30/0613* (2013.01); *G06Q 50/01* (2013.01)

(58) Field of Classification Search
CPC ..................................................... G06Q 30/06

USPC ....................................................... 705/27.1
See application file for complete search history.

(56) References Cited

U.S. PATENT DOCUMENTS

| | | | |
|---|---|---|---|
| 6,963,850 B1 * | 11/2005 | Bezos | G06F 17/30867 705/26.41 |
| 7,587,359 B2 | 9/2009 | Levy et al. | |
| 8,688,505 B1 | 4/2014 | Kraybill | |
| 9,072,974 B2 | 7/2015 | Graf et al. | |
| 2002/0184111 A1 * | 12/2002 | Swanson | G06Q 10/0875 705/26.5 |
| 2006/0004600 A1 * | 1/2006 | Summer | G06Q 30/0225 705/1.1 |
| 2006/0085259 A1 | 4/2006 | Nicholas et al. | |
| 2007/0220540 A1 | 9/2007 | Walker et al. | |
| 2007/0282693 A1 * | 12/2007 | Staib | G06Q 30/02 705/26.5 |
| 2008/0077473 A1 | 3/2008 | Allin-Bradshaw et al. | |
| 2009/0055291 A1 | 2/2009 | Ho et al. | |

(Continued)

*Primary Examiner* — Mila Airapetian
(74) *Attorney, Agent, or Firm* — Wolf, Greenfield & Sacks, P.C.

(57) ABSTRACT

Various affinity systems and methods are provided to enable the capture of unique end-to-end purchase information. In some embodiments, the data collected through affinity systems and methods can be used to develop insights into the purchase making decision processes of users at any point of a shopping experience. The systems can host interaction platforms to facilitate the exchange of information, opinion, and/or suggestions on products, recommendations, and/or opinions. Further embodiments provide analysis of the captured data to derive insights regarding the appeal of products/services and the qualitative opinions of the users about the products/services.

26 Claims, 35 Drawing Sheets

(56) References Cited

U.S. PATENT DOCUMENTS

| | | |
|---|---|---|
| 2009/0271293 A1 | 10/2009 | Parkhurst et al. |
| 2010/0023378 A1 | 1/2010 | Ratnam |
| 2010/0332283 A1 | 12/2010 | Ng et al. |
| 2011/0035295 A1 | 2/2011 | Lifson |
| 2011/0153451 A1 | 6/2011 | Bitz et al. |
| 2011/0184780 A1 | 7/2011 | Alderson et al. |
| 2012/0109714 A1 | 5/2012 | Azar |
| 2012/0116905 A1 | 5/2012 | Futty et al. |
| 2012/0246580 A1 | 9/2012 | Bouverat |
| 2012/0265635 A1 | 10/2012 | Forsblom |
| 2012/0265646 A1* | 10/2012 | Ghadialy et al. .......... 705/26.61 |
| 2012/0278127 A1 | 11/2012 | Kirakosyan et al. |
| 2013/0110584 A1 | 5/2013 | Eggers et al. |
| 2013/0132221 A1 | 5/2013 | Bradford et al. |
| 2014/0164173 A1 | 6/2014 | Kassaei et al. |
| 2014/0279232 A1 | 9/2014 | Lau et al. |
| 2014/0279233 A1 | 9/2014 | Lau et al. |

\* cited by examiner

Insights - What are people saying?

—2102

The overshelming impression is one of support and affirmation:

| Most common phrasing is some combination of: |  |
|---|---|
| Love | dress, |
| Like | this |
|  | One, |

—2110

"You would look fabulous in that dress".

"I LOVE this dress. I think it would be stunning on you".

"this is my favorite one... will look AHhhhhmazing with your eyes"

—2104

...balanced with honest advice, some humor:

"Eh. It's white (screaming for a stain) and its strapless (I just don't like) and I'm never a fan of the little random ribbon around the middle. I say pass."

"Na. Too night club."

"Did you ever see the Sex in the City movie where Samantha shows up wearing the same dress as Miley Cyrus? I feel like that's a possibility in this dress."

—2106

...and some free marketing:

"have you checked out the web site yet??really beautiful gowns to choose from and lots of reviews and pics of real people in them..I think I am going to wear a long dress after all... when you see the real people pics and the comments and compliments they got when wearing the dresses... this is def the way to go'

*FIG. 21*

Insights - Responses from respondents

Most respondents post only one response. Some make multiple responses to a single question (as seen in the slide above), while other respondents answer questions on as many as seven dresses...

Should I rent...?

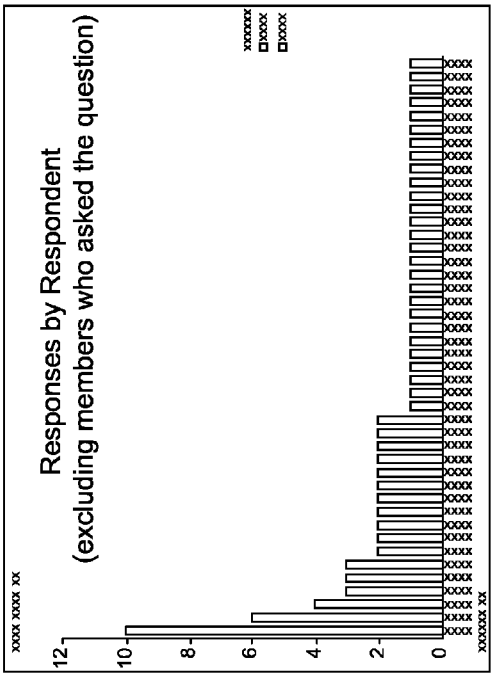

Responses by Respondent
(excluding members who asked the question)

| | |
|---|---|
| Max | 7 |
| Min | 1 |
| Average | 1.6 |

Responses from respondents

Note: sample includes only question that generated answers

 I like this but it's pretty standard, I say yes because it's a classic style – it won't be the wrong choice, but I'm not wowed by it.

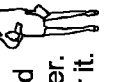 I LOVE this dress. I think it would be stunning on you. And you can't beat a gorgeous dress with long sleeves in December. This was one of my picks but I'd be happy to see you wear it.

 Eh. It's white (screaming for a stain) and its strapless (I just don't like) and I'm never a fan of the little random ribbon around the middle I say pass.

Na. Too night club.

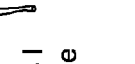 I wasn't sure about this one at first but after reading the comments I think it's a top contender... It looks very flattering and I think the customer pictures do it more justice than the model.

 I don't know how to change my vote but I say definitely no. Read the reviews and one girl says its too form fitting and would be appropriate for club attire. And she's 5'11 and wears a size 2.

I like this one a lot. Love the color and the cut is flatting.

FIG. 23

Asking Questions Flow Example

— 2700

2701 — Asker requests product page.
2702 — Retailer returns product page HTML.
2703 — Asker clicks "Ask" button; request sent to 2630
2704 — 2630 returns HTML form.
2705 — Asker fills in question details form data and submits; HTTP Post to 2730
2706 — 2630 creates Question in QuestionDB
2707 — 2630 queries Product DB for existing entry; if none exists saves product metadata to Product DB
2708 — 2630 queries RelationshipGraph DB with Asker ID
2709 — RelationshipGraph returns list of users to 2630
2710 — 2630 queries ExpertDB with metadata of product, product URL, question details, asker and limits of RelationshipGraph (querying ExpertDB)
2711 — ExpertDB returns ranked list of users to 2630
2712 — 2630 returns HTML with visual list of people to invite
2713 — Asker clicks person's headshot or submits an email addrss to invite; HTTP Post of user and question id sent to 2630
2714 — Invited user is notified via Email of FB post
2715 — Metadata of product page and question text is applied to Expert Query engine for documents of invited ids (Tagging invited in expert db)
2716 — Metadata of product page and question text is applied to Expert Query engine for document of asker (tagging asker in expert db)

FIG. 27

Answering Questions - Commenting
via Web Flow Example ⟵ 2900

2901 — Answer adds comment and submits a POST request with comment and question id to AFS 2902 — AFS saves comment to Question DB 2903 — Question DB returns list of users to notify about the comment 2904 — AFS emails user to notify (Asker and Answerers)

2905 — Save comment text and metadata to Answerer record of Exper Query DB and update Answerer record to include text and metadata of question and products 2906 — Return updated view with comment back to Answerer

FIG. 29

Answering Questions - Commenting
via Email Example Flow ← 3100

3101 — Answerer replies to email notification.
   a. Sends email to address that encodes question id and context, captured from email notification.
   b. AFS receives new email, downloads, and parses body for comment, identifying the question id and context from email address.
3102 — AFS saves comment to Question DB to question: id
3103 — Question db returns list of users to notify about the comment
3104 — AFS emails user to notify (askers, and answerers)
3105 — Save comment text and metadata to Answerer record of Exper Query DB and update Answerer record to include text and metadata of question and products

FIG. 31

Answering Questions - Voting Process Example ⟵ 3300

3301 — Answerer clicks on vote link in email, sending a request to AFS
3302 — AFS saves vote to Question DB to question id
3303 — Question DB returns list of users to notify about the comment
3304 — AFS emails users to notify (Asker and Answerers)
3305 — Save vote product to Anserer record of Expert Query DB and update Answerer record metadata of question and products
3306 — AFS returns HTTP redirect to client to retailer.com
3307 — Client request sent to retailer.com for question
3308 — Retailer.com returns HTML
3309 — Client requests question from AFS, ID obtained from browser context
3310 — AFS returns HTML of question

From: "Rent the Runway" <rtr@e.rentherunway.com>
Subject: Josie Asked 'What Should I wear?'
To: amiau@alum.mit.edu
Reply-To: "Rent the Runway" <support-b7pra59bfg5zhjauwp0vbqchvgp3g5@e.rentherunway.com>

RENTTHERUNWAY

Thanks for voting on Josie's poll!
"I'm going to a fundraiser, which ones will look good on me?"

To show our appreciation, here's $20 off* your first rental.
Use Code: RTRNEW2075

Sign Up

3 Yes   3 Yes   3 Yes   3 Yes
1 No    1 No    1 No    1 No

Join Rent the Runway now for FREE and get $20 off* your first rental.
*Offer is valid on rentals of $75 or more for a limited time only. Promotional offers cannot be combined. One per user.

FIG. 35

SYSTEM AND METHOD FOR AN AFFINITY CAPTURE, USER FEEDBACK AND AFFINITY ANALYSIS

RELATED APPLICATIONS

This application claims priority under 35 U.S.C. §119(e) to U.S. Provisional Application Ser. No. 61/783,155 entitled "SYSTEM AND METHOD FOR AFFINITY CAPTURE, USER FEEDBACK AND AFFINITY ANALYSIS," filed on Mar. 14, 2013, which is incorporated herein by reference in its entirety.

BACKGROUND

Conventional perception of shopping and purchasing activity includes the outdated concept that groups of people get together in a social setting to purchase various goods, including clothes, accessories, etc. The reality of shopping and purchasing activity is that more and more purchasing takes place as a single user operating a computer on an on-line site.

SUMMARY

It is realized that augmenting conventional on-line shopping websites with a social platform provides for soliciting qualified opinions provides unique opportunities for facilitating shopping, engaging shoppers, and delivering feedback. The social platform can communicate or integrate with existing sites to provide options for interacting with other qualified users. In some implementations, soliciting and evaluating the opinions of other qualified users can enable an improved shopping experience.

Further, the platform can improve engagement, and increase social interaction. In some embodiments, affinity/feedback systems are provided that generate feedback for shoppers during their shopping experience. In addition to providing real-time feedback and opinions to shoppers, affinity and feedback systems can be configured to analyze a complete purchasing experience. The complete purchasing experience can include, for example, initial identification of interest (e.g., establishing a purchase intent), specification of a product or service detail, actual identification and/or comparison of products/services, any interaction between shopping participants, conversations between participants, actual service/product purchase, and can also include after purchase conversation and/or review.

In some implementations, affinity and feedback systems can be connected to and/or include recommendation systems that can be configured to target engagement to shoppers, and/or their connections based on analysis of user affinities, product affinities, and/or information generated within the end to end purchase process tailored by a shoppers intent. These affinities can be determined based on relationships between the users, relationships between the users and products being discussed, prior shopping activity, and can also include relationship information (e.g., to products, users, and/or context) captures from social networking sites.

Accordingly, systems and methods are provided for implementing an affinity and feedback system. In one embodiment, the affinity systems and methods are configured to facilitate purchase experiences for a shopper/user through execution of interactive help sessions. User comfort with purchases can be enhanced by providing qualified opinions during a shopping experience. The systems and methods deliver identifications of other users qualified to assist the shopper in the help sessions. Further, a user may target one or more contacts of their personal network for the purpose of soliciting help. Qualified users can be automatically identified by the system, for example, from the shopper's on-line social connections. Additionally, the system can automatically identify advisor experts based on any purchase intent defined by the user.

According to one embodiment, the shopper/user selects participants for a help session from the list of qualified users. The list of qualified users can be ranked based on relationship information associated with the qualified users (e.g., user profile information can include information on the same or similar purchases, the same or similar categories of purchase, participation in help sessions for the same or similar purchases, help sessions for the same or similar categories of purchase, etc.). Each of the user's selections can be delivered as a request or notification to participate in the Help Session. According to one embodiment, the user is asked to specify the context associated with the help request (e.g., buy evening dress, dress for wedding, baby shower, digital camera, etc.).

In some embodiments, the help session can be presented as a webpage separate from a retailer, or in other implementations, the session can be integrated within the retailer's domain. In one implementation, the system is configured to accept user selection within the identification of the qualified users, solicit information from the qualified participants (e.g., through e-mail notification), provide for submission of feedback from the qualified participant, provide for visualization by the shopper and qualified participant of the purchase conversation, provide for notification of updates to any conversation, and to collect and store data about the help session.

Collection and storage can include, for example, collection of information on purchase intent, identification of qualified users, user selection of qualified users, conversations between users, processed conversations, limiting purchase selections, actual purchase, and post purchase activity. The stored information can be used to create user profiles on the shopper and the shopping participants. In some embodiments, each user identified by the system is associated with a user document providing a unique identifier for the user and storing associated information.

Further product profiles can also be stored and include information on the users considering the products for purchase, discussing the products, purchasing the products, etc. In some embodiments, each product identified by the system is associated with a product document providing a unique identifier for the product and storing associated information on the product. In some implementations, responsive to help sessions both users and products are tagged with information about each other, and/or the data captured from the help session (e.g., as data within a user and/or product document).

According to some aspects, the affinity systems and methods enable the capture of unique end-to-end purchase intent information. In some embodiments, the data collected through affinity systems and methods can be used to develop insights into the purchase making decision processes of users at any point of a shopping experience. Further embodiments provide analysis of the captured data to derive insights regarding the appeal of products/services and the qualitative opinions of the users about the products/services.

According to one aspect a system from providing an affinity and feedback platform is provided. The system comprises at least one processor operatively connected to a memory, the processor when executing is configured to accept user definition of product characteristics, publish a help request for product selection including the product characteristics to a group of related users, responsive to the product characteristics, and identify, automatically, the group of related users based, at least in part, on at least one of on-line social connections accessible for the user and associations between existing user profiles and the product characteristics.

According to one embodiment, the system includes a capture component configured to capture the on-line social connections for the user from third party on-line systems. According to one embodiment, the capture component is configured to access at least one of social media platforms, FACEBOOK, LINKEDIN, TWITTER, e-mail service platforms, HOTMAIL, GMAIL, YAHOO!MAIL, MICROSOFT LIVE, photo sharing platforms, SHUTTERFLY, PHOTOBUCKET, PINTEREST, review sharing platforms, YELP, etc. According to one embodiment, the capture component is configured to identify automatically product selection content on the third party systems. According to one embodiment, the capture component is configured to generate and associate metadata with a user profile responsive to product selection content.

According to one embodiment, the system comprises a ranking component configured to determine a ranking for members of the group of related users. According to one embodiment, the ranking component is configured to alter a ranking for a member of the group of related users responsive to prior shopping interactions with the user. According to one embodiment, the ranking component is configured to alter a ranking for a member of the group of related users responsive to the user selecting the member of the group of related users for the help request. According to one embodiment, ranking component is configured to alter a ranking for a member of the group of related users responsive to help request information captured by the system responsive to help requests submitted by other users.

According to one embodiment, the system comprises a display component configured to generate a display of the group of related users in a user interface. According to one embodiment, the display component is configured to access ranking information from a ranking component, and organize the display of the group of related users based, at least in part, on the ranking information. According to one embodiment, the display component is configured to access ranking information that associates rankings to users based, at least in part, on affinities between at least one of the user initiating the help request and the product characteristics accepted from the user.

According to one embodiment, the display component is configured to access identification information provided by an identification component, and organize the display of the group of related users, based at least in part, on the identification information. According to one embodiment, the display component is configured to display a group of expert users associated with the help request published by the system responsive to the identification information. According to one embodiment, the display component is configured to organize the display of the group of expert users according to respective rankings.

According to one embodiment, the system comprises a display component configured to generate a user interface display, wherein the user interface display is configured to accept user selection of members of the group of related users to participate in the help request. According to one embodiment, the system comprises a help component configured to generate a help request platform for managing interaction between help request participants selected from at least one of the group of related users. According to one embodiment, the help component is configured to permit access to the help request platform to system identified users (e.g., members of the group of related users, and/or expert users). According to one embodiment, the help component is configured to generate a web page for the help request platform including at least one of a product, a product group, and multiple products on which the help request participants can answer questions.

According to one embodiment, the help component is configured to generate a conversation display for providing input from the help request participants. According to one embodiment, the help component is configured to generate a display for voting on a plurality of product, and a display for adding at least one alternative product responsive to input from a help request participant. According to one embodiment, the help component is configured to identify automatically additional items for review, responsive to determined context of interactions between the help request participants and the user. According to one embodiment, the system comprises a recommendation component configured to determine product recommendations responsive to user identification of connections to participate in the help request.

According to one embodiment, the system comprises a recommendation component configured to determine product recommendations responsive to purchase intent of the user. According to one embodiment, the recommendation component is configured to identify products according to the purchase intent of the user and evaluate metadata associated with the identified products based on a purchase intent associated with the metadata. According to one embodiment, the recommendation component is configured to rank the identified products based on the evaluation of the metadata for intent. According to one embodiment, the recommendation component is configured to determine product recommendations responsive to commentary posted by respective users during execution of the help request. According to one embodiment, the recommendation component is configured to determine product recommendations responsive to product metadata associated with user profiles (including e.g., user selection of a specific user for help request, product characteristics associate with a user profile based on a help request, clickstream for user, click log, etc.). According to one embodiment, the recommendation component is configured to deliver determined recommendations from users' connections to the user. According to one embodiment, the recommendation component is configured to select within user connections for the user based on affinity ranking.

According to one embodiment, the system comprises an analysis component configured to analyzed help request information. According to one embodiment, the analysis component is further configured to determine a user intent responsive to analysis of the help request information. According to one embodiment, the analysis component is further configured to store intent definitions with at least one of user profiles and product profiles.

According to one aspect, a computer implemented method for delivering feedback is provided. The method comprises accepting, by a computer system, user definition of product characteristics, publishing, by the computer system, a help request for product selection including the product characteristics to a group of related users, responsive to the product characteristics, and identifying, automatically by the computer system, the group of related users based, at least in part, on at least one of on-line social connections accessible for the user and associations between existing user profiles and the product characteristics.

According to one embodiment, the method further comprises capturing the on-line social connections for the user from third party on-line systems. According to one embodiment, capturing includes accessing at least one of social media platforms, FACEBOOK, LINKEDIN, TWITTER, e-mail service platforms, HOTMAIL, GMAIL, YAHOO!MAIL, MICROSOFT LIVE, photo sharing platforms, SHUTTERFLY, PHOTOBUCKET, PINTEREST, review sharing platforms, YELP, etc. According to one embodiment, the method further comprises identifying automatically product selection content on the third party systems.

According to one embodiment, the method further comprises generating and associating metadata with a user profile responsive to product selection content. According to one embodiment, the method further comprises determining a ranking for members of the group of related users. According to one embodiment, ranking includes altering a ranking for a member of the group of related users responsive to prior shopping interactions with the user. According to one embodiment, ranking includes altering a ranking for a member of the group of related users responsive to the user selecting the member of the group of related users for the help request. According to one embodiment, ranking includes altering a ranking for a member of the group of related users responsive to help request information captured by the system responsive to help requests submitted by other users.

According to one embodiment, the method further comprises generating a display of the group of related users in a user interface. According to one embodiment, the method further comprises accessing ranking information, and organizing the display of the group of related users based, at least in part, on the ranking information. According to one embodiment, the method further comprises accessing ranking information that associates rankings to users based, at least in part, on affinities between at least one of the user initiating the help request and the product characteristics accepted from the user. According to one embodiment, the method further comprises accessing identification information, and organizing the display of the group of related users, based at least in part, on the identification information.

According to one embodiment, the method further comprises displaying a group of expert users associated with the help request published by the system responsive to the identification information. According to one embodiment, the method further comprises organizing the display of the group of expert users according to respective rankings. According to one embodiment, the method further comprises generating a user interface display, wherein the user interface display accepts user selection of members of the group of related users to participate in the help request.

According to one embodiment, the method further comprises generating a help request platform for managing interaction between help request participants selected from at least one of the group of related users. According to one embodiment, the method further comprises permitting access to the help request platform to system identified users (e.g., members of the group of related users, and/or expert users). According to one embodiment, the method further comprises generating a web page for the help request platform including at least one of a product, a product group, and multiple products on which the help request participants can answer questions.

According to one embodiment, the method further comprises generating a conversation display for providing input from the help request participants. According to one embodiment, the method further comprises generating a display for voting on a plurality of product, and a display for adding at least one alternative product responsive to input from a help request participant. According to one embodiment, the method further comprises identifying automatically additional items for review, responsive to determined context of interactions between the help request participants and the user. According to one embodiment, the method further comprises determining product recommendations responsive to user identification of connections to participate in the help request.

According to one embodiment, the method further comprises determining product recommendations responsive to purchase intent of the user. According to one embodiment, the method further comprises identifying products according to the purchase intent of the user and evaluating metadata associated with the identified products based on a purchase intent associated with the metadata. According to one embodiment, the method further comprises ranking the identified products based on the evaluation of the metadata for intent. According to one embodiment, the method further comprises determining product recommendations responsive to commentary posted by respective users during execution of the help request. According to one embodiment, the method further comprises determining product recommendations responsive to product metadata associated with user profiles (including e.g., user selection of a specific user for help request, product characteristics associate with a user profile based on a help request, clickstream for user, click log, etc.)

According to one embodiment, the method further comprises delivering determined recommendations from users' connections to the user. According to one embodiment, the method further comprises selecting within user connections for the user based on affinity ranking. According to one embodiment, the method further comprises analyzing help request information. According to one embodiment, analyzing include determining a user intent responsive to analysis of the help request information. According to one embodiment, analyzing includes storing intent definitions with at least one of user profiles and product profiles.

According to one aspect, a system for providing generating product catalog information is provided. The system comprises at least one processor operatively connected to a memory, the processor when executing is configured to receive a plurality of tracking communications, from at least one browser monitor process configured to capture user browsing activity, responsive to the user accessing at least one e-commerce site, identify and capture product characteristics from the received user browser activity within the tracking communications, store site or merchant identifiers in association with a product document for each product identified from the product characteristics, wherein the system is configured to build a product catalog of products for one or more merchants or one or more websites responsive to aggregating the plurality of tracking communications.

According to one embodiment, the system further comprises the at least browser monitor process installed and executing on a user's local computer system. According to one embodiment, the at least one browser monitor process automatically identifies and communicates product information from web-sites accessed by the user. According to one embodiment, the at least one browser monitor process identifies and communicates product information from web-sites accessed by the user responsive to user selection. According to one embodiment, the system further comprises the at least one browser monitoring process, wherein the at least one browser monitor process is installed and executing on the at least one e-commerce site. According to one embodiment, the at least one browser monitoring process is downloaded to the user's computer system as browser executable code as part of a web page served to the user's computer, and executes in response to the user viewing the webpage.

According to one embodiment, the system is configured to store the product characteristics as metadata associated with respective products. According to one embodiment, the system captures product characteristics including at least one of suggested price, price, title, brand, color, category, sku, product image, url, related products, sizes, availability, or hosting website. According to one embodiment, the system captures product characteristics including user comments. According to one embodiment, the system is configured to provide user access to the product catalog of products by merchant or site. According to one embodiment, the system is configured to associate user context information with respective products.

According to one aspect a computer implemented method for generating product catalog information is provided. The method comprises receiving, by a computer system from at least one monitor, a tracking communication responsive to a user accessing at least one e-commerce site, identifying, by the computer system, product characteristics from the received tracking communication, storing, by the computer system, the product characteristics including at least a site or merchant identifier for each product identified from the product characteristics, and generating, by the computer system, a product catalog of products for one or more merchants or one or more websites responsive to aggregating the plurality of product tracking transactions.

According to one embodiment, the method further comprises an act of installing and executing the at least one monitor on a user's local computer system. According to one embodiment, the method further comprises identifying automatically by the at least one monitor product information from web-sites accessed by the user; and communicating the product information to the computer system. According to one embodiment, the method further comprises identifying and communicating product information from web-sites accessed by the user responsive to user selection. According to one embodiment, the method further comprises executing the at least one monitor on the at least one e-commerce site.

According to one embodiment, the method further comprises downloading the at least on monitor to the user's computer system as browser executable code as part of a web page served to the user's computer, wherein executing occurs in response to the user viewing the webpage.

According to one embodiment, the method further comprises storing the product characteristics as metadata associated with respective products. According to one embodiment, the method further comprises product characteristics includes storing at least one of suggested price, price, title, brand, color, category, sku, product image, url, related products, sizes, availability, or hosting website. According to one embodiment, storing product characteristics includes storing at least one of includes storing user comments in associated with a respective product.

According to one embodiment, the method further comprises providing user access to the product catalog of products by merchant or site. According to one embodiment, the method further comprises storing user context information with respective products.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 21 illustrates a screen capture of an example user interface display, according to some embodiments;

FIG. 23 illustrates a screen capture of an example user interface display, according to some embodiments;

FIG. 27 illustrates an example process flow according to one embodiment;

FIG. 29 illustrates an example process flow, according to one embodiment;

FIG. 31 illustrates an example process flow, according to one embodiment;

FIG. 33 illustrates an example process flow, according to one embodiment;

FIG. 34 illustrates example re-marketing objects, according to some embodiments; and FIG. 35 illustrates example re-marketing objects, according to some embodiments.

DETAILED DESCRIPTION

Figure 1:
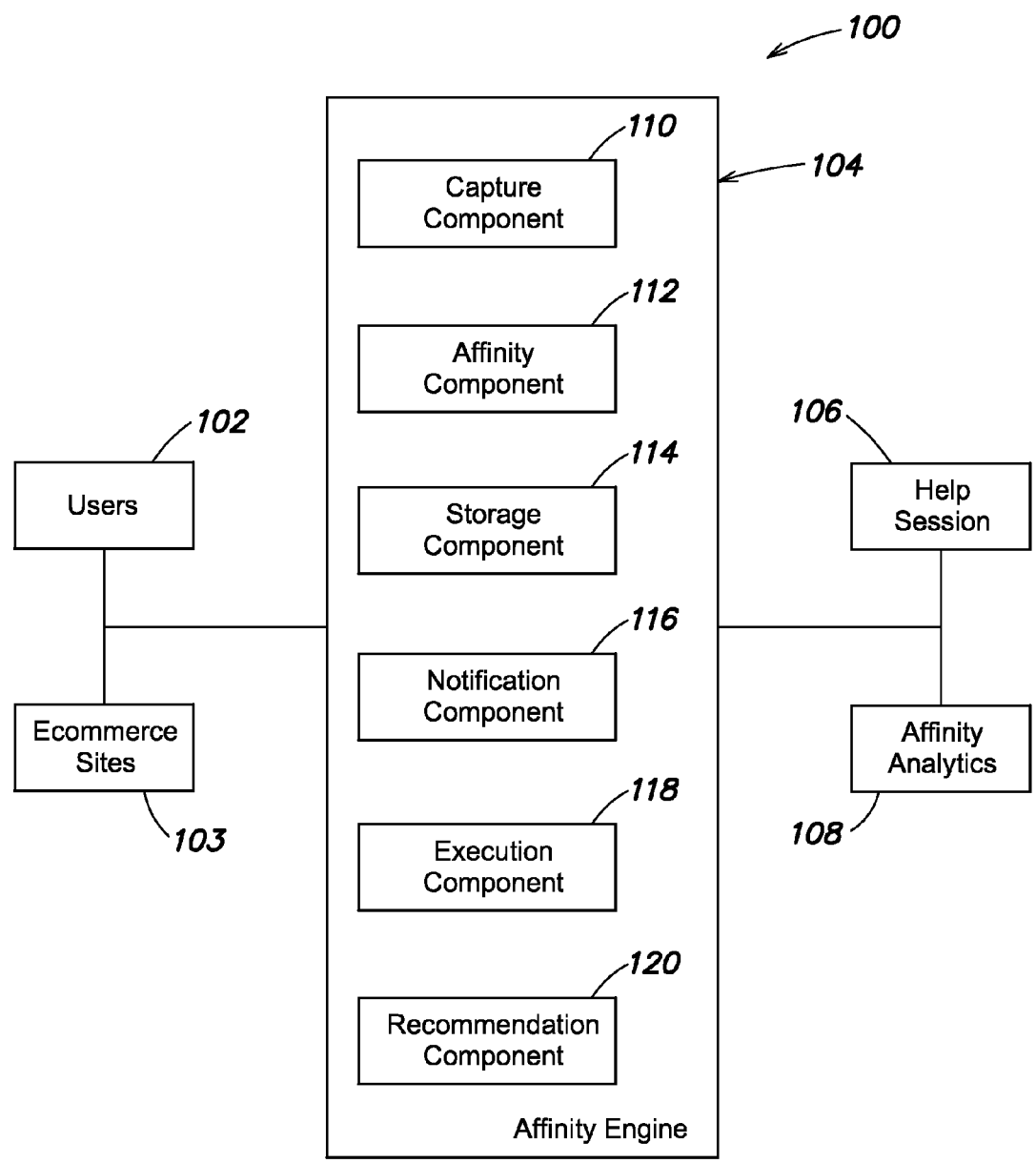
FIG. 1 is a block diagram of an affinity and feedback system, according to one embodiment.

As described above, systems and methods are provided to define an affinity and feedback platform configured to facilitate capture, analysis, and execution of purchase intent by shoppers. According to one aspect, an affinity and feedback system ("affinity system") is provided. The affinity system is configured to provide person-to-person discovery of purchase intent (e.g., purchase/service characteristics, purchase event definition (e.g., wedding, formal occasion, baby shower, etc.)) through purchase help interactions. The purchase help interactions can be hosted by the affinity system as a "help session." The help session can be hosted on the affinity system and accessed, for example, from a user interface display of products and/or services that can be delivered as part of retailer's web-site or separately from a given retailer.

According to some embodiments, a shopper/user defines a help request in association with a request for input or a solicitation of ideas/suggestions from the user's connection. According to other embodiments, a shopper/user can also or alternatively define a help request in association with identifying information on a product and/or service. The identifying information can include specification of one or more products or services the shopper is considering purchasing. In some examples, the user identifies help session participants by defining a question about a product or service on which the users wishes to receive opinions. The product or service question can broadly specify a product category, narrowly specify a single product, multiple products, etc. The system delivers the users request, for example, as an e-mail or post to the help session participants identified by the user. Within each request is a link or navigation option that enables the help session participants to access the help session hosted by the system. In some examples, help session requests include a time limit for participation in order to generate urgency for the request.

The e-mail or post can provide for a help session participant to enter a response directly by selecting a display in the e-mail or post. In some embodiments, the help session provides a vehicle for the shopper to receive immediate feedback, access comments, or suggest alternative products at their leisure. Once a decision is made, the shopper can notify the participants of their purchase decision.

According to other embodiments, the affinity platform can be configured to track information associated with each purchase interaction of a user, as well as all the information generated during a help session. Information is stored on the user/shopper, as well as the shopper's connections, selected participants, and the products and services discussed. For example, the affinity system can build profiles on users as well as products, where the metadata from purchase activity and/or help session execution is stored as metadata. The purchase intent associated with such activity or sessions can also be used to define the context in which the metadata was captured. Various embodiments are configured to analyze purchase intent along with metadata to provide additional insight into the context of commentary, suggestions, alternate product identification, etc. The affinity system can then provide richer and more focused recommendations to any shopper.

Additional embodiments of the affinity system provide lightweight integration tools for existing e-commerce sites. The integration tools can be used by the system to capture metadata during purchase activity on an ecommerce site. The captured metadata associated with various products can be used by the system to define product catalogs of various merchants as shoppers navigate the merchants' websites.

FIG. 1 shows a block diagram of an example affinity and feedback system 100, according to one embodiment. System 100 can include an affinity engine 104. Affinity engine 104 can be configured to manage interactions between shoppers (e.g., users 102, advisors, and on-line shopping services (e.g., ecommerce sites 103) to deliver qualified commentary and/or opinions tailored to the shopper's purchase intent. In some embodiments, the affinity engine can host a help session 106 configured to allow shoppers to interact and/or converse on a purchase decision. The interactions and/or conversations can be organized by affinity engine 104 to provide natural and relevant feedback to a shopper trying to decide on a purchase. In other embodiments, affinity engine 104 can be configured to develop and analyze affinity data on shoppers, products, between shoppers, and between products, to provide rich metadata which can be associated with purchase intent. In one example, purchase intent metadata can be derived from the creation of the help session and/or the interactions and conversations during execution of the help session. Affinity engine 104 can be configured to analyze the metadata to develop insights into purchase intent and to provide analytic displays 108 on purchase activity, including new analytics regarding help session interaction.

System 100 and/or its elements (e.g., affinity engine 104) can be provided using a computing system such as the computer system 600 and/or 602 described with reference to FIG. 6. According to one aspect, system 100 and/or affinity engine 104 can be configured to generate help sessions for shoppers to receive feedback on their purchase decisions. System 100 and/or affinity engine 104 can be configured to manage selection of help session participants. In one embodiment, affinity engine 104 is configured to identify people connected to a shopper, automatically, and present those connections ordered on their qualification to assist the shopper with a specific help session.

According to some embodiments, an affinity engine can directly implement the functions and features associated with initiating a help session. In other embodiments, the affinity engine can include other components specially configured to perform various sets of the functions and features associated with initiating, executing, and capturing information from a help session. Shown in FIG. 1, affinity engine 104 can include a capture component 110 configured to capture a shopper's purchase intent. The shopper's purchase intent can include specification of characteristics of a good or service on which the shopper is seeking opinions, identification of goods or services, identification of multiple goods, price among other options.

According to some embodiments, a help session can be initiated by the shopper/user on any e-commerce site. For example, the capture component 110 can include lightweight scripts that can be introduced into any web-based e-commerce site. Additionally, the lightweight scripts can be introduced into any conventional browser used to access e-commerce sites. The lightweight scripts can be configured to generate and display user interface elements within or overlaying exiting displays shown on a browser. The user interface elements can be selectable within the user interfaces of any known e-commerce site to trigger the definition and execution of a help session, including capturing the shopper's purchase intent. For example, the user interface elements can be labeled "Ask for Help," "Ask Friends," and/or "Poll Friends" (see e.g., FIG. 7, 702) and can be displayed in conjunction with goods and/or services available on any known shopping web-site. In various embodiments, the interface elements can be configured to begin generation of a help session responsive to selection.

Figure 7:
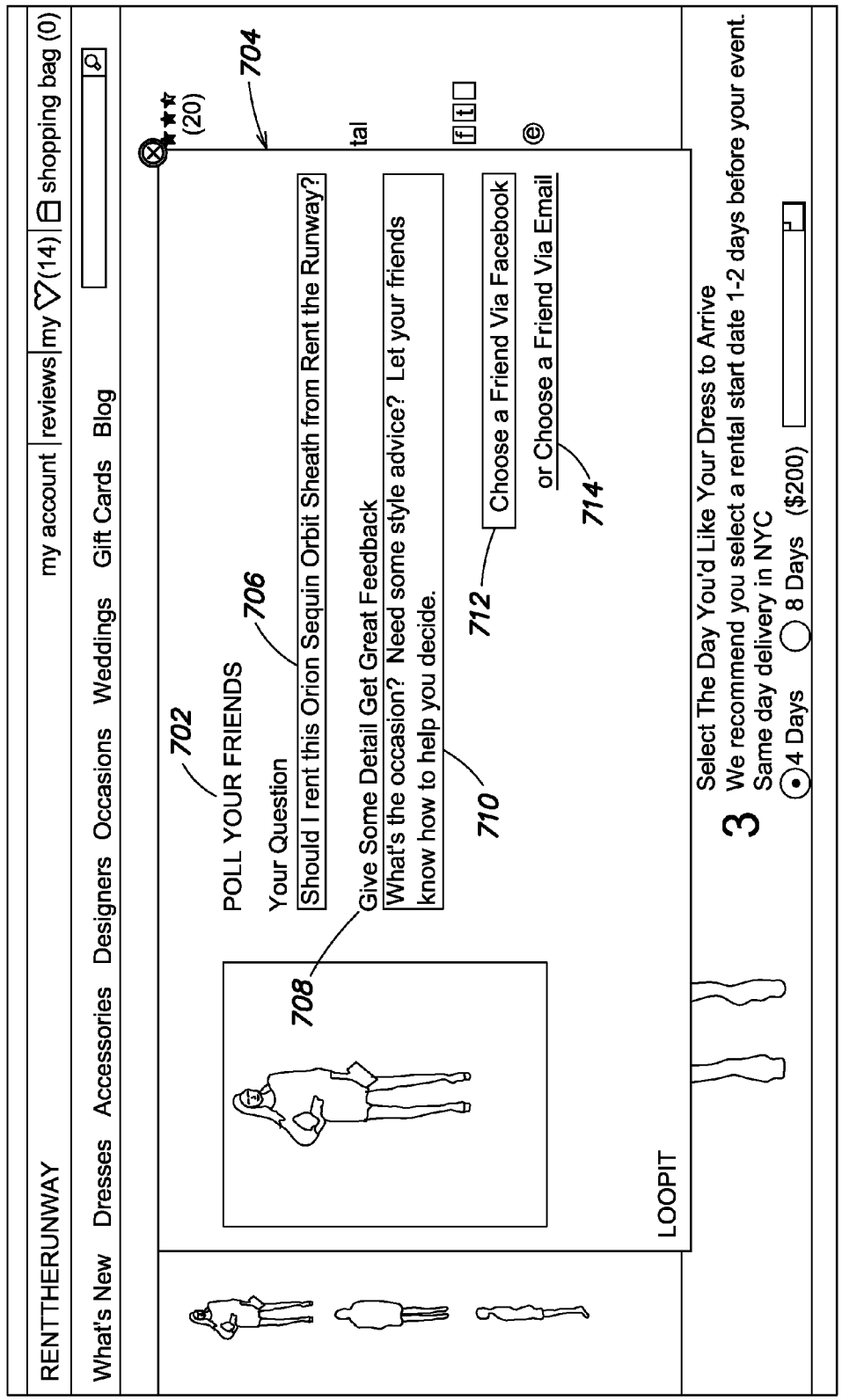
FIG. 7 illustrates a screen capture of example user interface displays, according to some embodiments.

According to one embodiment, a shopper can access a specific item on a shopping site (see 722, FIG. 7). Within the display of the selected item the capture component 110 can generate a selectable display to "Poll Your Friends" at 702. Responsive to selection, the capture component 110 can be configured to generate a display (e.g., 704, FIG. 7) for defining the scope of a help request for the help session. According to one example, the capture component 110 generates a text display configured to accept user input of a question to be answered in the help session (e.g., 706: "Should I rent this Orion Sequin Orbit Sheath from Rent the Runway"). In some embodiments, the display 706 is further configured to request additional details regarding the reasons for the purchase for entry in additional text boxes (e.g., at 708 "Give some Detail. Get Great Feedback"). In some examples, the capture component 110 is configured to display questions in the text boxes to assist the shopper in providing addition detail for the help request (e.g., at 710: "What's the occasion? Need style Advice? Let your friends know how to help you decide.").

Figure 8:
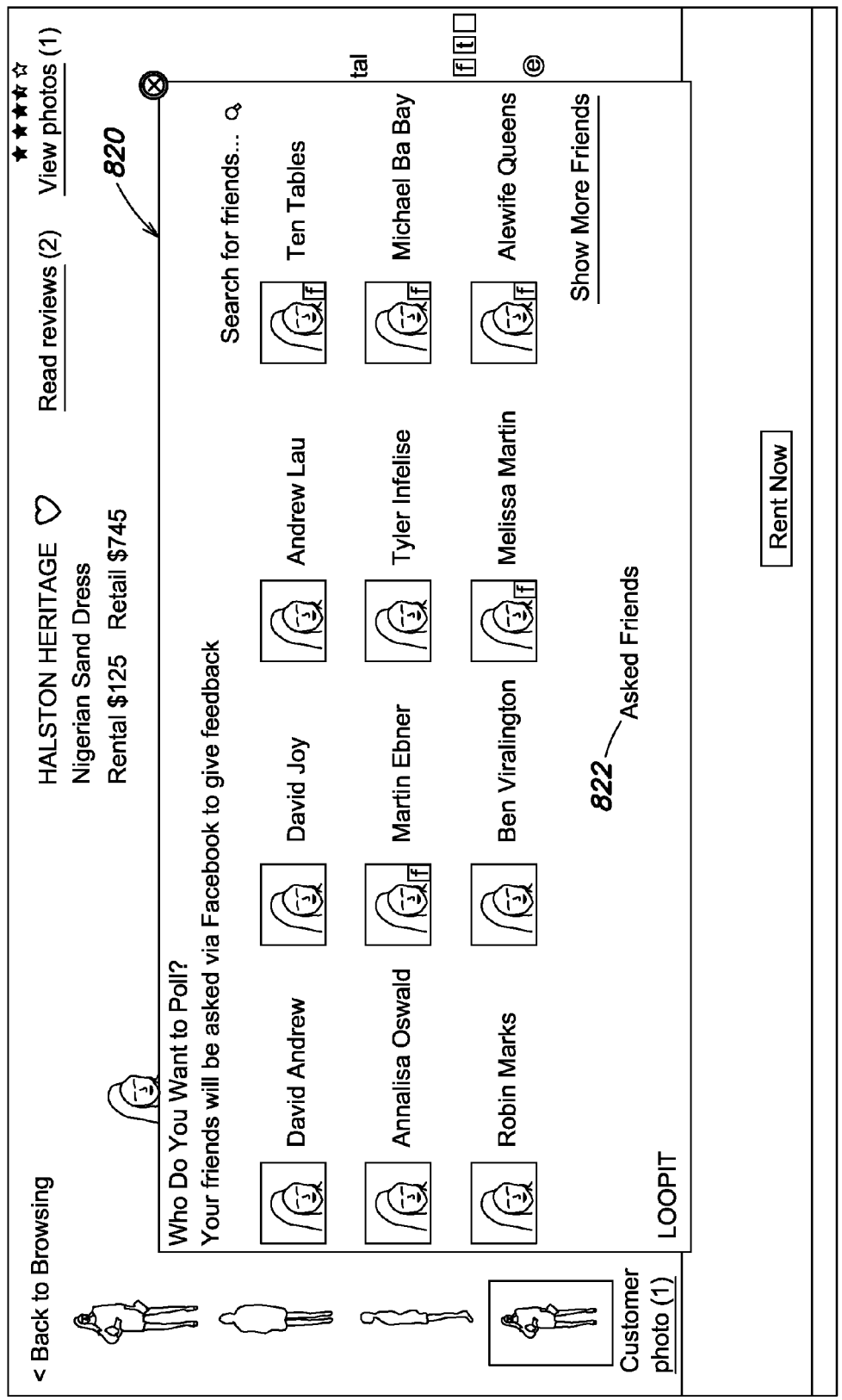
FIG. 8 illustrates a screen capture of an example user interface display, according to some embodiments.
Figure 9:
FIG. 9 illustrates a screen capture of an example user interface display, according to some embodiments.
Figure 10:
FIG. 10 illustrates a screen capture of an example user interface display, according to some embodiments.
Figure 11:
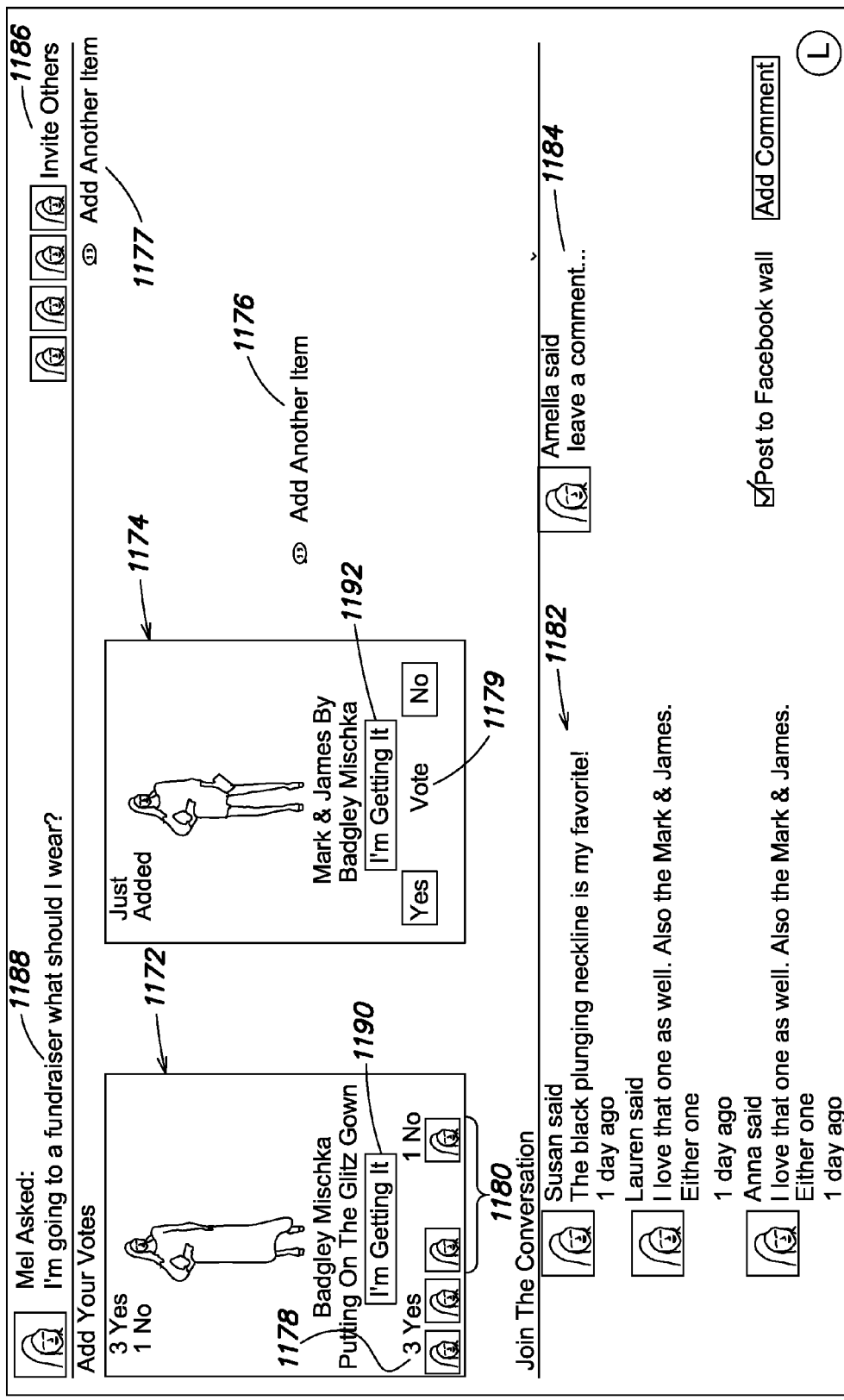
FIG. 11 illustrates a screen capture of an example user interface display, according to some embodiments.

According to some embodiments, the capture component 110 can be configured to facilitate user selection of participants for a help session. For example, once the question and any details are defined, the capture component 110 can be configured to next display lists of potential participants for the help session. (e.g., a user may select 712 or 714 to transition to a display of potential participants e.g., 820, FIG. 8).

According to one embodiment, the system and/or the capture component 110 can be configured to present to a current user/shopper lists of other users or expert advisors best suited to help the shopper make a purchase selection. The user can select from the displays of system identified shopping participants (e.g., at 820) with whom the user wishes to interact during the help session. In one example, the capture component 110 captures information on a user's social connections from social networking sites (e.g., FACE-BOOK, LINKED-IN, MYSPACE, TWITTER, INSTAGRAM, etc.) or other on-line services (e.g., HOTMAIL, GMAIL, etc.). The user's connections are then presented for selection by the user. In some embodiments, system 100 can store information on the user's social connections for later analysis (e.g., each connection can also be a shopper or shopping participants for other users, etc.). In one example, user profiles are generated and maintained on the system for each shopper and any other users identified as connections (e.g., by a storage component 114 discussed in greater detail below).

Notably, the user has some knowledge of other user's (friends) knowledge and/or taste, and therefore their knowledge of their friends abilities can be captured by system 100. Also, because a facility is provided to permit a user to consult their social network contacts, the user is more likely to execute a purchase. Likewise, having observed the user executing a purchase, the user's social connections become more likely to execute purchases of their own.

According to one embodiment, affinity engine 104 can include an affinity component 112 configured to rank the user's connections based on their qualification to assist the user during a help session. According to one embodiment, the affinity component 112 can be configured to determined user qualifications based on information stored in user profiles. The user profiles can be developed based on prior participation in help sessions, prior identification of the user as a connection to a shopper, prior shopping activity, etc. The affinity component 112 can rank a shopper's connections based on their associated profiles, and ranking can be determined responsive to the shopper's purchase intent. The ordered or ranked list can be displayed to a user to select participants (e.g., at 820).

In some embodiments, the user is also presented the option to select advisor "experts" identified based on the user's purchase intent. The affinity component 112 can be configured to determine advisor experts based on their qualification to advise on the question being asked by the shopper, and the determination can account for the purchase intent defined for the question (e.g., formal occasion). According to one embodiment, a ranking algorithm can weight information, commentary, and metadata, associated with a user profile in determination the user's qualification for participating in a help session. Experience within the same context (e.g., prior participation in help session having a formal occasion settings) can be weighted greater than participation in a help session outside the same context. According to some embodiments, the affinity component can be configured to analyze and weight any information associated with a shopper's connections to define an ordering for display. For example, the affinity component 112 can rank connections based on product affinity between the connection and the product or service identified for the help request. In another example, the affinity component 112 can rank connections based on interactions between the connection and other shoppers, other connections, etc. The affinity component 112 can be configured to analyze conversations, messages, tagged photos, opinion exchanges, etc., to determine a user's qualification to assist in a help session based on purchase activity associated with their respective profile.

In some embodiments, the shopper can manually select a number of participants to ask to participate in the help session. Selected connections can also be displayed in a user interface (e.g., at 822). System 100 can be configured to record information on the selection of specific participants as part of a respective user profile. By recording information of selection as a participant, system 100 can generate and develop user profiles on which to rank user connections.

According to one embodiment, system 100 and/or affinity engine 104 includes a storage component 114 configured to capture information generated during a help session (including, e.g., initiation by the shopper, execution of the help session, post purchase activity, among other options). For example, information generated on system 100 during and even after a purchase can be used to define metadata recorded by the storage component 114 as part of the start of a help session. According to some embodiments, the stored information can be associated with the user/shopper asking for help making the purchase. In other embodiments, the stored information is associated as metadata with the user/shopper, the shopping participants, the products or services being discussed, and the products or service purchased.

System 100, engine 104, and/or storage component 114 can also be configured to build user profiles using the metadata. For example, user profiles can be generated or updated responsive to identification with respect to a shopper, a product or service, participation in a help session, commentary, shopper agreement or disagreement with commentary, etc., as metadata is stored in an associated user profile. In addition, product profiles can also be generated by system 100, engine 104, and/or storage component 114 where the same information can be stored in association with a product or service, a product or service category or class, among other options.

According to another aspect, each user/shopper record becomes a base unit for organizing information generated during a help session or other purchase activity. The identified user record and the associated profile becomes a searchable and evolving document that records all of the interactions and information on shopping experiences for that identified user as metadata. Similarly, identified product records and their associated profiles are generated by the system to organize the information from various help sessions or purchase activity.

Users identified as connections to a shopper, the shopper, commentary, other products viewed in conjunction with a session, can all be stored as metadata for specific products and/or product classes or categories. For example, product profiles can organize each data entry, product class profiles can also include the metadata associated with the product profiles within that class. Additionally, user purchase intent can be captured and stored in conjunction with user records and/or product records, and/or any metadata for which purchase intent is defined or known.

As discussed, the storage component 114 can be configured to capture and generate profile information, which can be used by the affinity component 112 to order captured information. During generation of a help session by system 100, the affinity component 112 can be configured to access the metadata on a shopper's connections to order a list of potential participants (e.g., shown at 820). Further, the affinity component 112 can access user profile information outside the shopper's connections to identify expert advisors for display to the user as potential participants. In some embodiments, the affinity component 112 can automatically select participants for a help session, responsive to the user requesting help. In one example, the affinity component 112 can be configured to generate automatically a group of participants based on the ordering of the shopper's connections. In one example, the affinity component 112 can be configured to select a number of the highest ranked connections.

Once shopping participants are selected by the user or automatically, system 100 can generate a notification and/or request for the identified users to participate in a help session. According to some embodiments, affinity engine 104 can include a notification component 116 configured to deliver a help session request to identified participants. The notification component 116 can be configured to generate the notification as an e-mail to the shopper's connections (e.g., 930) or as a post to a social site. The notification can be generated to include any question defined for a help session (e.g., 932), as well as an additional detail regarding the context of the questions. The notification can include an image of the product, service, or class on which the shopper is asking for advice (e.g., 934). In some examples, the notification component 116 is configured to generate displays within the notification associated with answers to the question presented (e.g., 936, 938, 940). Selection of the displayed answers results in the participant navigating to an associated help session (e.g., 1050) hosted by system 100 and/or affinity engine 104.

The help session can be hosted within a retailer's domain or can be hosted outside of any associated retailer's web space. In some embodiments, system 100 and/or affinity engine 104 can include an execution component 118 configured to manage the execution of the help session. According to one aspect, the execution component 118 is configured to implement an intent per page paradigm. The intent per page paradigm is configured to define a platform (e.g., a web page) that reflects a shopper's intent in asking for help. The execution component 118 is configured to generate the help session (e.g., as a web-page), which provides for an interactive environment between and amongst help request participants. The execution component 118 can be configured to interact with the storage component 114 to track portions of the end-to-end transaction (e.g., selection of a product, generation of a help request to a social group, the debating between participants of the pros/cons of product selected, and potentially the decisions and execution of a purchase by the shopper). Each participant input can be stored in association with the shopper, the participants, and the products or services being discussed. This comprehensive capture and analysis allows the affinity system to derive insights of the entire purchase process and analyze subsequent transactions on that basis, while providing the shopper and the participant immediate feedback within the help session.

The execution component 118 can be configured to generate a variety of help sessions depending, for example, on a shopper's purchase intent. Shown at 1050 is an example webpage associated with a single product purchase help request. According to one embodiment, the product subject to the help request can be displayed at 1052 as well as the question being answered at 1054. In some embodiments, result information is displayed in real-time as answers are received from selected participants (e.g., at 1056). As information is collected, the shopper can receive immediate feedback through the help session web-page displays. Additionally the shopper can receive alerts and/or notifications as the help session page is updated. Further, each participant can also see the results of the help session as they are received (e.g., at 1056). Any commentary received on the help request question can be displayed on the help session page. The execution component 118 is configured to accept commentary (e.g., 1057, 1059) and display commentary from any participant (e.g., 1060), fostering conversation on the question, the product or service, and/or on other user's commentary.

In some implementations, a participant in a help session can be analyzed to identify their connections (e.g., FACE-BOOK, TWITTER, MYSPACE, etc. contacts). For example, the capture component 110 can identify help session participants connections for display to the participant on the help session page. The participant can identify their connections believed to be best suited to assist in the help session (e.g., at 1058). The participant's connections can likewise be ranked by their qualification to assist in the help session (e.g., as determined by the affinity component 112).

In some embodiments, the execution engine 118 can be configured to generate and manage a help session for evaluating or helping a shopper decide between multiple products or services (e.g., session 1170). The page generated by the execution engine 118 can display multiple products (e.g., 1172, 1174) and can also include functions to add additional products (e.g., 1176 or 1177). Newly added items can be displayed by the execution component 118 with additional controls, for example, to enable voting on the newly added items (e.g., 1179). In addition, each product displayed can include information on votes received (e.g., 1178), and in some examples, information on the participants associated with each vote (e.g., 1180). The help session can also include displays of any commentary provided (e.g., 1182), and provide the option for additional comments (e.g., at 1184). Similarly to single product help sessions, the execution engine 118 is configured to allow participant to identify their own connections suited to assist with the shopper's decision (e.g., at 1186). As discussed above, the execution component 118 can provide any and all inputs generated during the help session (e.g., comments, identification of participants connections, votes and new product selections) to the storage component 114 for retention. In some embodiments, the execution component 118 and/or the storage component 114 can be configured to execute natural language processing (NLP) on the received commentary to derive additional metadata on the purchase experience. For example, the context associated with a purchase decision can be derived from participant commentary, even if the initial definition of the help session did not detail any context. The information captured can be associated or tagged with any context (e.g., from the question defined 1188 "fundraiser," or derived from commentary).

In some embodiments, each product display for the help session can be generated by the execution component 118 to include a purchase selection option (e.g., 1190 and 1192). The purchase selection option is configured to enable the shopper to identify their ultimate decision. For example, in response to selection of 1190, a given help session can terminate, for example, closing the help session page to selection of new items. In other embodiment, user interface displays delivered within the help session can include "checkout pixels" and/or "add to cart pixels," which can be configured to terminate a "help session" in response to selection.

Termination of the help session can include, for example, a notification to the help session participants regarding the shopper's selection, posting of the shopper's selections to a social network site, among other options. In some embodiments, participants can continue to comment and interact within the help session after the shopper makes their purchase decision. In one example, the shopper can post or upload pictures of the product purchase, show the product being used, etc. The shopper and/or help session participants can also provide post purchase commentary.

Figure 12:
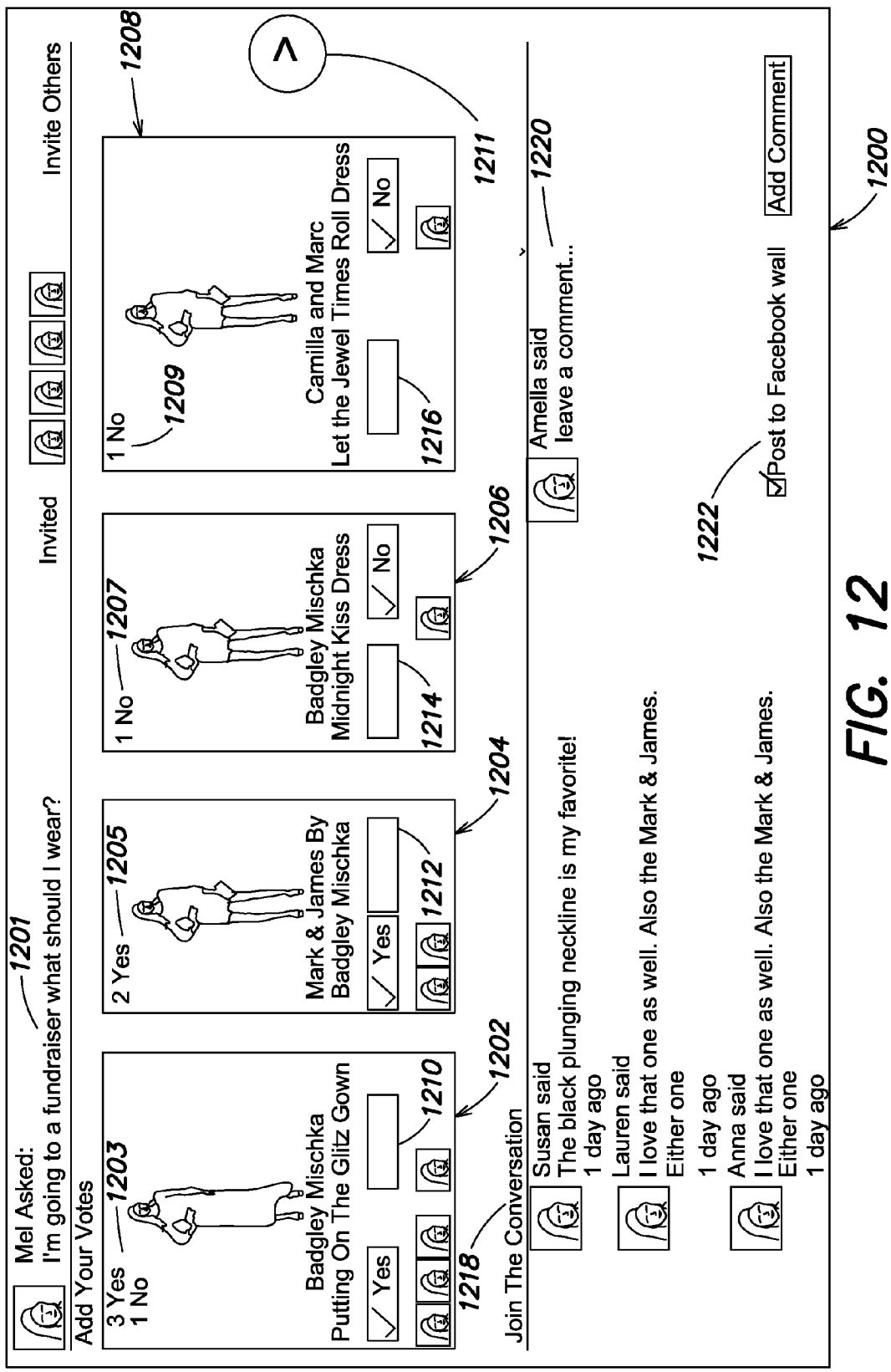
FIG. 12 illustrates a screen capture of an example user interface display, according to some embodiments.

In some embodiments, the execution engine 118 can be configured to present different views of the help session page depending on the user viewing the help page. For example, execution engine 118 can be configured to visualize functions for the shopper that are not displayed to participants (e.g., 1190—"I'm getting it"). In some embodiments, adding items may be limited to the shopper who initiated the help session. Shown on FIG. 12, is another embodiment of a user interface (1200) for a help session generated by the execution component 118. Each product identified (1202, 1204, 1206, and 1208) for a help session question (e.g., 1201) can be displayed in the user interface (1200). Where additional products have been identified, but do not fit within the display window additional controls can be displayed to allow the shopper and participants to visual the additional products (e.g., at 1211). The displays of individual products can each include summary information regarding answers to the question presented (e.g., a number of votes received at 1203, 1205, 1207, and 1209). In some embodiments, products may be displayed based on votes received. According to one example, participant view of the help session page can display the respective participant's answer to the question presented (e.g., 1201) with any other answers grayed out (e.g., at 1210, 1212, 1214, and 1216). Each answer can also be accompanied by an image of the respective participant. In some implementation, each view of the help session provides information on any commentary, conversation, or submitted opinion provided in the help session (e.g., at 1218). Participants and the shopper can add their own comments (e.g., at 1220), at any time during the help session. In some embodiments, commentary provided can also be distributed by the execution component 118 through available social networking sites associated with the commentator (e.g., FACEBOOK at 1222).

Figure 13:
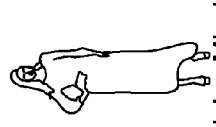
FIG. 13 illustrates a screen capture of an example user interface display, according to some embodiments.

According to one embodiment, system 100 and/or affinity engine can include a recommendation component 120 configured to provide intent tailored recommendations to the shopper. Further, the recommendation component 120 can be configured to provide intent tailored recommendations as suggestions to participants, who in turn can select the recommended products or services for inclusion or consideration during a help session. Shown in FIG. 13, is an example user interface 1330, similar to 1200, where interface 1330 includes recommendations generated by the recommendation component 120 (e.g., at 1332).

As discussed above, the storage component 114 and/or execution component 118 can be configured to track shopper intent and context during the execution of a help session. The interactions between help participants (including for example, the help participants who do not comment) are captured and associated with data records for the users and the products. For example, each product records and/or user records is tagged with information on the interactions, the shopper's intent, and which can include NLP on the commentary generated during the help session. The recommendation component 120 can be configured to access the information contained in user records and/or product records to identify recommended products having a matching intent based on the capture of intent information. Rather, than finding similar products having similar characteristics as in conventional recommendation systems, the recommendation component 120 can be configured to match recommendations for alternative product selections based on a common purchase intent identified between products being considered and a listing of addition recommendations (e.g., at 1332).

Figure 2:
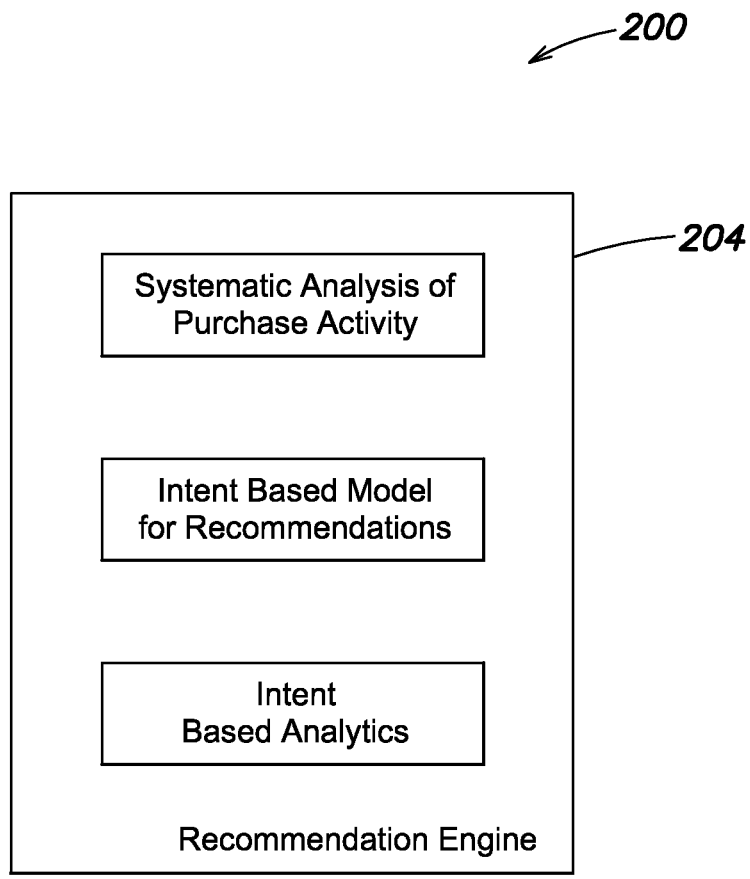
FIG. 2 is a block diagram of a recommendation system, according to one embodiment.

According to another aspect, an affinity system (e.g., 100) can provide data to a separate recommendation system 200, FIG. 2. The recommendation system 200 can include recommendation engine 204. The recommendation system 200 and/or the recommendation engine 204 can be configured to shift conventional marketing paradigms to incorporate an intent based model. Purchase and marketing opportunities can be identified by the recommendation engine 204 based on information associated with a user intent tracked in conjunction with products and/or users associated with that intent. For example, data generated by an affinity system (e.g., 100) captures shopper intent during purchase activity and/or execution of purchase help sessions. The products reviewed, discussed, and even the participants (including the shopper) are identified and tagged with shopper intent information. The data generated during the purchase activity becomes a dynamic and evolving corpus of intent based product, service, and user data.

System 200 and/or its elements (e.g., engine 204) can be provided using a computing system such as the computer system 600 and/or 602 described with reference to FIG. 6. According to one embodiment, the recommendation system 200 and/or recommendation engine 204 can analyze the corpus of intent data to identify connections between users, and rank those connections based on common intent based interactions. Users having common intent based experiences can be identified to promote certain products or services relative to those commonalities of intent. Further, users can be ranked on intent based criteria to promote users most likely to impact a target user. According to one example, specific connections are selected for the target user responsive to intent based analysis. Marketing and/or engagement material can be delivered to the target from the specific connections identified.

According to some embodiments, the recommendation system is configured to execute systematic analysis of help activity captured during help sessions (e.g., by an affinity system (e.g., 100)). The recommendation system 200 and/or recommendation engine 204 can be configured to analyze a target user's identification of other users for help sessions and provided intent based rating of those connected other users. Additionally, the recommendation system 200 and/or engine 204 can also generate rating information based on analysis of help group comments, and/or analysis of product and/or product characteristics subject to help request.

In further embodiments, the recommendation system 200 and/or engine 204 is configured to implement an intent based model for delivering recommendations. The system and/or engine can target connections to a specific user responsive to help questions and answers delivered during help sessions. Further, the system 200 and/or engine 204 can derive intent information from a user click-stream (i.e., the shopper's click log) to identify recommendations matching the derived intent.

In some embodiments, the recommendation engine 204 is configured to generate rankings of recommendations for products responsive to analysis of aggregate responses from help groups regarding a target product. Further, the recommendation engine 204 can generate intent tailored recommendations responsive to queries executed on user profiles, product profiles (e.g., based on metadata of products on a help page, products on recent click-stream (click log), users in help group, invited users, and any linguistic query against a product or user db (db may include hierarchical organization of db).

In addition, the recommendation system 200, can provide for search engine marketing (SEM) for people (e.g., based on metadata tags associated with user profiles generated through an affinity system (e.g., 100)). Search engine marketing conventionally provides for marketing of specific results and/or products by promoting a product, service, or results within a search engine. The recommendation system 200 can be configured to enable promotion of people responsive to tracked interactions during purchase activity. In some embodiments, intent matching can be used to promote specific users.

In some embodiments, the recommendation system 200 and/or engine 204 can be configured to derive analytics from information captured by affinity platforms (e.g., 100). The recommendation system can be configured to enable merchandizing by identifying connections for a target shopper, and using the connections to generate suggestions to the target shopper delivered from the connections. According to one embodiment, the recommendation system 200 can rank the target shoppers connections using the information captured during purchase activity (including, e.g., help sessions). For example, the recommendation system can identify patterns and characteristics through discovery of purchase characteristics from help sessions, based on users having been asked about products, based on participating or not in help sessions.

According to various embodiments, the systems discussed (e.g., 100 and 200) can interact to facilitate capture of intent based shopping information, delivery of qualified feedback to shoppers, execution of help sessions, and/or recommendation generation and delivery. The system can implement a variety of process for execution and analyzing purchase interaction.

Figure 3:
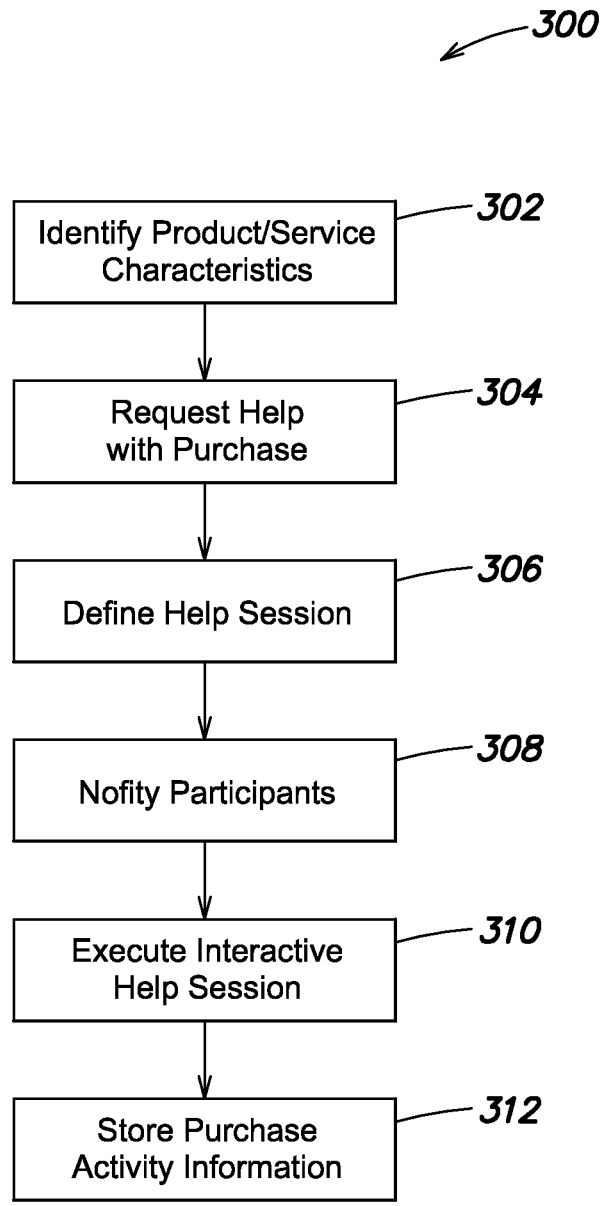
FIG. 3 is an example process flow for managing the execution of a purchase help session according to one embodiment.

Shown in FIG. 3 is an example process flow 300 for managing the execution of a purchase help session. In some embodiments, the process 300 can be executed by an affinity system (e.g., 100) and/or an affinity engine (e.g., 104). Process 300 or portions of process 300 can also be executed by various components of an affinity engine (e.g., 104) to manage the execution of a purchase help session.

According to one embodiment, process 300 begins at 302 with the identification of product or service characteristics. In one example, a user identifies product or service characteristics by selecting a specific product or service on an e-commerce website. The e-commerce website can include any on-line platform for selling goods or services. Once a user has selected identified product characteristics by selecting a specific product, the user can request help at 304 to make a purchase decision associated with the selected product. Shown in FIG. 7 is a retail site and associated product being viewed by a user. The product display can include visual elements that enable the user to request help at 304 (e.g., 702). In other examples, a user may select a variety of products or services on a retail website and add them to a shopping cart, as is known the art. The user may request help with a purchase decision regarding the contents of the shopping chart or any subset of the identified items.

In other embodiments, product or service characteristics can be identified more generally. For example, classifications of products or services can be specified in a user interface at 302. A help request can be initiated at 304, with the object of helping the shopper make a specific selection with the classifications of the goods or services. Responsive to the help request at 304, process 300 continues with definition of a help session 306 to answer the help request. Definition of the help session can include specification of a question to be answered during the help session based on responses from help session participants. Definition of the help session can also include specification of participants for a given help session at 306. In one embodiment, a shopper triggers the definition of the help session at 306 by requesting help with a purchase at 304. The shopper can then be used to define participants. In one embodiment, the shopper is analyzed to determine their online social networking connections as part of 306 (e.g., FACEBOOK friends). The shopper's social connection can be evaluated for their ability to assist the shopper. In some embodiments, the shopper is asked to select from their connections to define participants for the help session. In other embodiments, participants can be automatically selected.

In further embodiments, specification of help session participants can also include analysis of users outside a shoppers connections. For example, help session experts can be identified to participate in the help session as part of 306. In some embodiments, the question asked for the help session and any intent based information defined as part of the help session can be used to analyze existing user records to determine the users most capable of helping the shopper make a purchase decision. The shopper can also be given the opportunity to select from help session experts as part of the definition of the help session at 306.

Once the help session is defined, process 300 continues with notification of the participants at 308. The notification can be generated as an e-mail to the selected participants (e.g., FIG. 7) or as a post to a social networking page associated with respective participant. In some embodiments, the notification generated includes access information enabling the participant to interact with a help session. In other embodiments, a user can reply to a help request e-mail directly, and the system is configured to receive the response and process the response into the help session (e.g., the system notifies others without the user having to do anything more).

At 310, the help session is executed. Execution of the help session at 310 can include generation of a web page which provides a platform on which the shopper and help session participants can interact. For example, the participants can comment on, vote for, and answer questions regarding one or more products or services on the platform. Execution of the help session at 310 can include the aggregation and display of the answers received, organization of product display based on received answers. Execution of the help session at 310 can also include delivery of page updates or changes to the help session participants. Any information entered or generated during the creation of the help session and/or execution of the help session can be stored at 312. According to one embodiment, storage of help session information can occur through process 300 and need not occur as a separate step.

In some examples, products, services, and user profiles are tagged and/or updated with the information generated by the creation of a help request and/or execution of the help session. In some embodiments, purchase intent information is stored with product records, and user records. Product information referenced during the help session can also be stored in user profiles for the help session participants (e.g., at 312). Product profiles can be tagged with the information on the participants in the help session, as well as commentary generated during the help session. In some examples, commentary generated during the help session can be processed using NLP and the interpreted commentary can be stored in association with user and/or product records. Process 300 is illustrated as an example, and different embodiments can be executed in different order, and may combined different steps during execution. Additionally some steps can be omitted from other embodiments.

Figure 4:
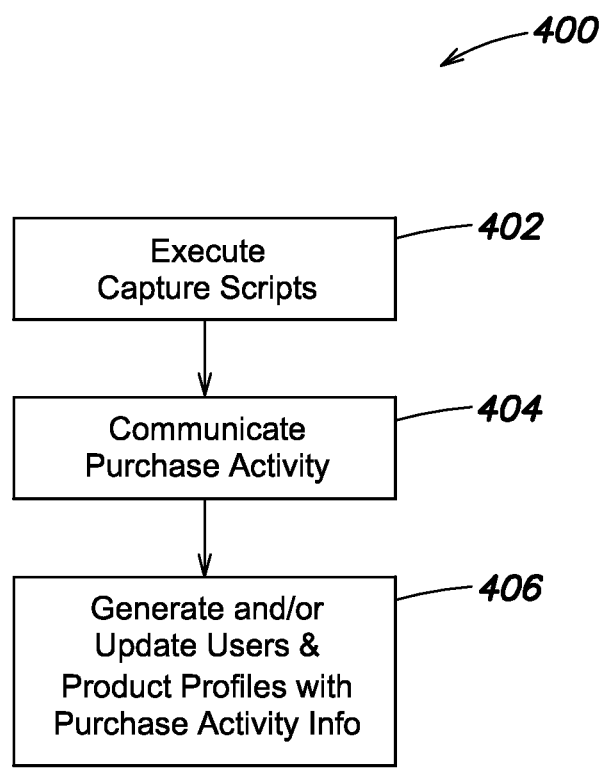
FIG. 4 is an example process flow for generating a product catalog, according to one embodiment.

Various affinity systems can also execute different process flows to capture purchase related information. In one embodiment, an affinity system (e.g., 100) can execute a process flow for capturing purchase related information from existing retail websites. Shown in FIG. 4 is an example process flow 400 for generating a product catalog. Process 400 begins with execution of an integration script on the existing retail website at 402. In some embodiments, the integration scripts can be provided to the retail website administrator for incorporation into the retail website. In other embodiments, the integration script can be provided as a browser plug-in that executes with a convention web browser to capture purchase activity of a shopper. At 404, purchase activity information is communicated. The purchase activity information can include product details, pricing, description, sizes, etc. displayed the retail website. Any information provided by the retail website on its products and/or services can be captured by the integration scripts executed at 402.

Once the purchase activity information is received, product documents are generated to hold the information for a given product or service (e.g., at 406). The product details, pricing, description, sizes, etc., are stored in a repository for development of a product catalog for the respective retail site. In addition to product information, data on the user accessing the product information can also be stored in the product document. Further, user documents can also be generated reflecting the products accessed by a specific user, and any context associated with the access (including, for example, other product selections, the order of access, etc.). Process 400 can be executed repeated over any number of times by a variety of users. Eventually, the execution of process 400 captures a comprehensive view of the products offered by a given retailer, providing a simple method of developing a product catalog.

Additionally, process 400 and/or integration scripts can be used by affinity systems (e.g., 100) to develop information on purchase activity that may not take place through a help session. Although in other embodiments, affinity systems can execute different processes for capturing help session information, managing help session, and to capture additional purchase information. In some embodiments, affinity systems can execute processes in conjunction with other systems. Further embodiments can provide information to be analyzed or used in processes executed by other system.

Figure 5:
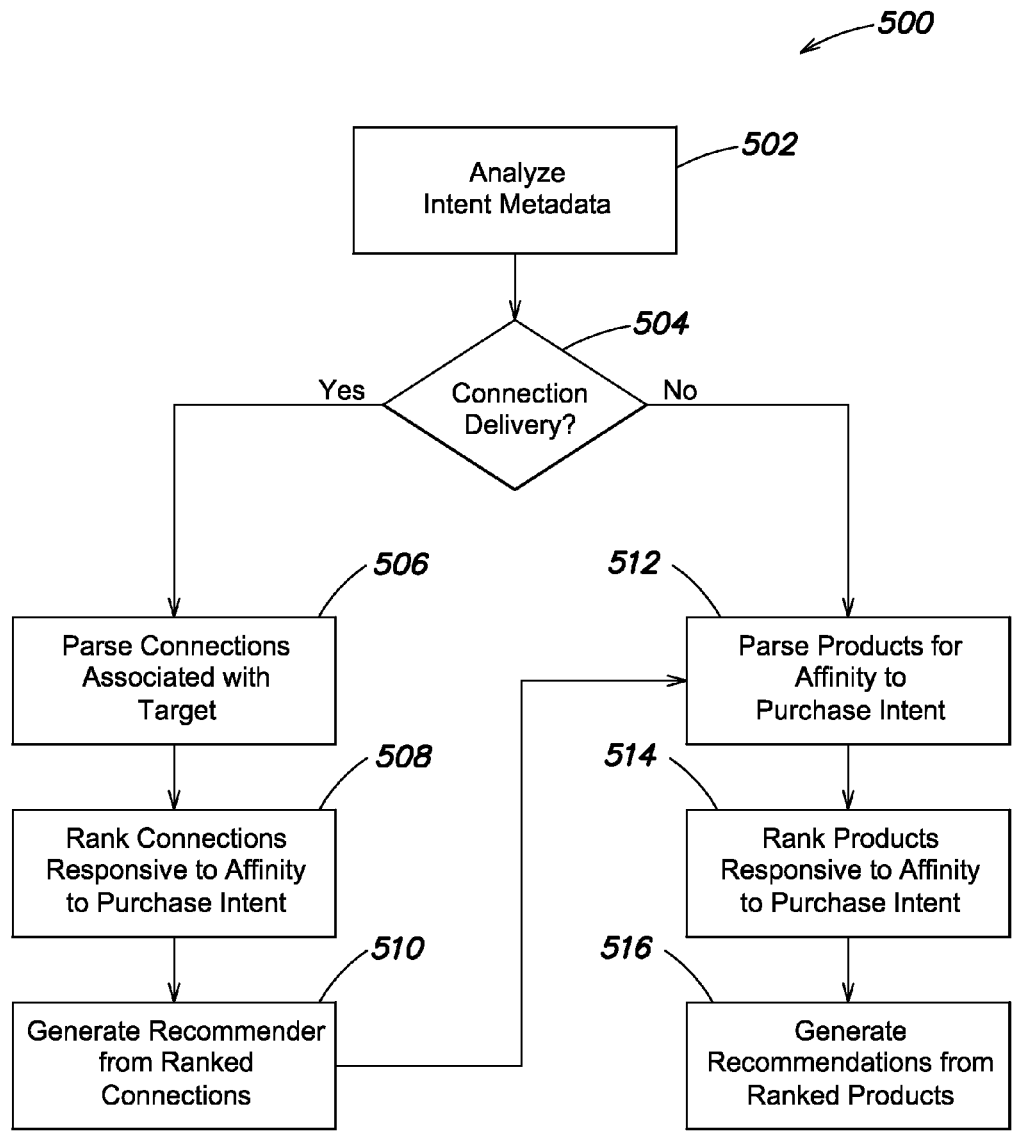
FIG. 5 is an example process flow for generating recommendations from intent based purchase information, according to one embodiment.

Shown in FIG. 5 is an example process flow 500 for generating recommendations from intent based purchase information. According to some embodiments, process 500 can be executed by a recommendation component (e.g., 120) or by a recommendation system (e.g., 200) and/or a recommendation engine (e.g., 204). The process 500 beings at 502 with analysis of purchase activity metadata associated with product, service, and/or user data records. In some embodiments, the purchase activity metadata can be captured and stored in conjunction with purchase intent information. The analysis at 502 can determine intent from stored metadata, or in some examples derive intent from the stored metadata. At 504, it is determined whether the recommendation is intended for delivery from a connection 504 YES. According some embodiments, process 500 can be configured to generate intent based recommendations for products and/ services. Further process 500 can be configured to identify connections to a target shopper, from whom the target shopper is likely to react positively to a product and/or service recommendation.

When a recommendation is intended for delivery from a target shopper's connection (504 YES), process 500 continues at 506 with parsing of the target shopper's connections for associated metadata. The target shopper connections are ranked at 508 based on their affinity to the target shopper's current purchase intent. For example, a target shopper looking for wedding dresses can be matched against their contacts who have recently looked for wedding dress, participated in help sessions for wedding dress purchases, and/or who have metadata associated with purchasing a wedding dress. At 510 one or more of the highest ranked connections can be identified as responsible for delivering a recommendation.

Once the connection has been identified at 510, and also where a recommendation is generated without a connection 504 NO, process 500 continues at 512. At 512, product metadata is parsed to identify product affinity to a current shopper's intent. As discussed above, each product record can be tagged with intent based metadata, and the current intent for a shopper can be used to match those product records. In some embodiments, each product can be ranked according to its affinity to the current shopper's intent at 514. For example, products discussed and/or subject to help session for the same shopper intent are scored with a higher affinity than products outside the same intent. Affinity scores can be weighted and/or altered based on additional metadata. For example, selection as an alternative to a currently viewed product can increase an affinity score for that product.

One or more products having the highest affinity for a current intent can be used to generate recommendation for intent matched products at 516. For recommendations that are to be delivered through a target shopper's connections, generation of recommendation can include generation of a recommendation message at 516. The recommendation message can be configured to appear to be delivered from the highest ranked connection and include information on the one or more highest ranked products. In some embodiments, the recommends generated at 516 can include generation of a recommendation display. For example, a recommendation display can be configured to present the intent matched product as part of a help session. The recommendation display can also be selected, by help session participants as options for a shopper's consideration. According to this embodiment, intent based recommendation can be generated and delivered by help session participants selected by the shopper themselves.

Example System and Flow Implementations

Figure 14:
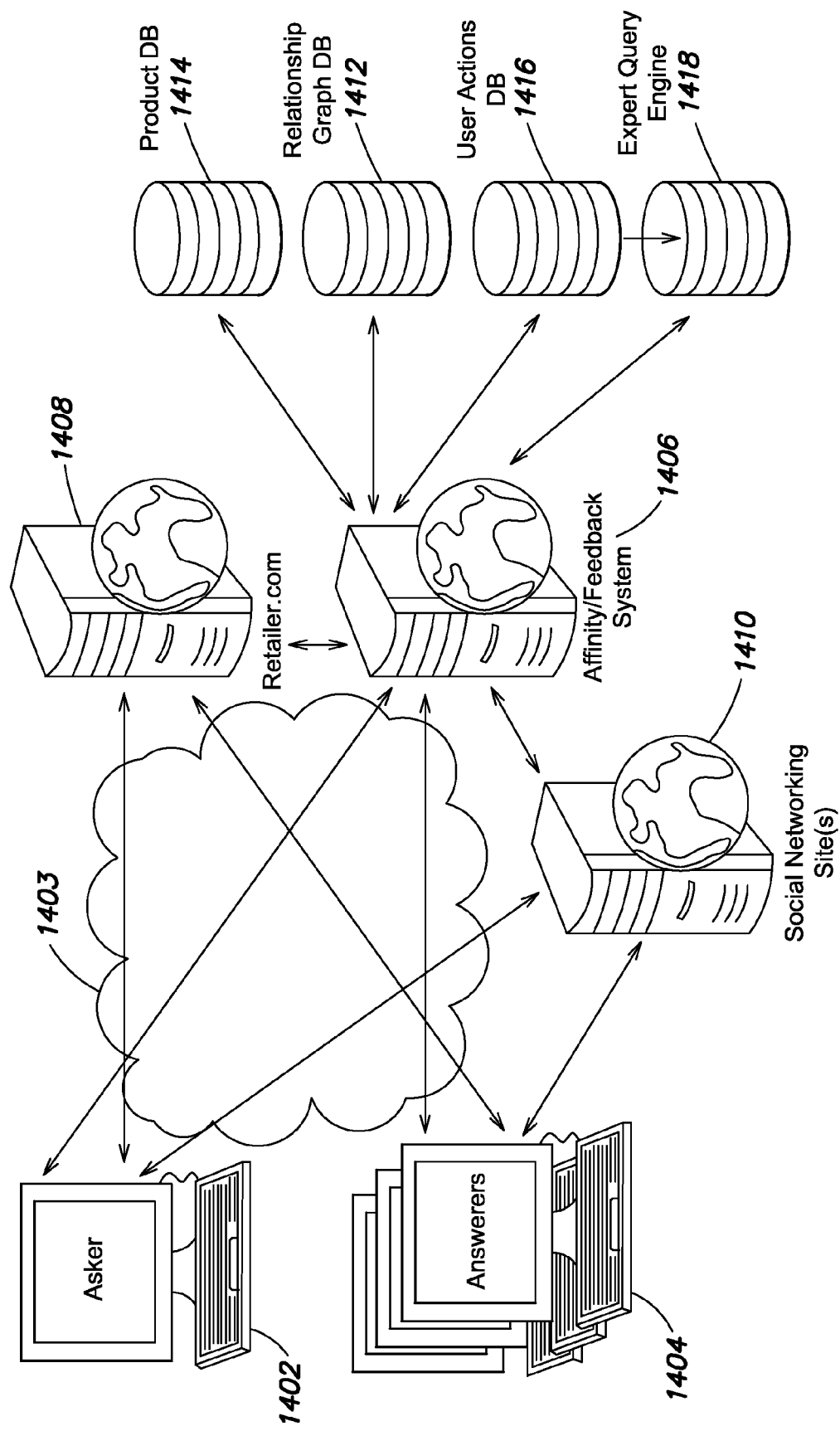
FIG. 14 illustrates example system elements and example data interactions between the system elements.

According to another aspect, various affinity and feedback systems can be implemented in the context of an "asker" 1402, FIG. 14, a more generic representation including a shopper and/or potential shopper or user accessing a website looking for advice over network 1403, who can use the affinity and feedback system (e.g., 1406) to solicit advise from "answerers" (1404). The answerers can be other users who can be identified from within and outside of the asker's social connections, including for example candidate help session participants, and selected help session participants. Social connections can be captured for an asker 1402 from any social networking site(s) 1410 they subscribe to, including, for example, FACEBOOK.

Additionally, answerers can include expert advisors identified by the system as qualified to answer an asker's question. An affinity and feedback system 1406 can be directly integrated and executed with the domain of an e-commerce web site 1408 or can be connected to the e-commerce on separate computer systems. In one example, the system 1406 can be connected the e-commerce site based on lightweight scripts that communicate information between the e-commerce site 1408 and the system 1406.

According to some embodiments, the system 1406 is configured to manage help sessions for the asker 1402, by facilitating the definition of a question to be asked in the context of a product, service, group of products/services, and/or classes of products/services on which the asker is seeking advice. The system 1406 can be further configured to identify the most qualified answerers 1404 based, for example, on information collected in one or more metadata repositories. The metadata repositories can be configured to organize information captured during the generation and execution of help sessions on the affinity and feedback system, including e.g., 1406.

In some embodiments, the repositories can include a product database 1414 configured to define and store information on products, services, groups of products/services, and/or classes of products or services as product document. Each product document can include a name for identifying or defining the document, and include within the document attribute-value pairs describing attributes of the document. Relationships between products and the users commenting on them, shopping for them, asking questions about them are stored as metadata within the document, for example, as attribute-value pairs. The attribute-value pairs can be used to reference other documents, reference other documents within other repositories. According to one embodiment, the product database 1414 can be built by the system 1406 one product interaction at a time, storing data from the e-commerce site 1408 on the product, as well as the user accessing it, any purchase intent information, and information generated during help session generation or execution.

In some embodiments, the product database accepts as an input data containing one or more of a url, title, price, brand, color, image, image_url, retailer name, among other options. The product database is configured to receive queries on "products with title: 'camera'" and output lists of products that match. According to one embodiment, the attribute-value pairs for product documents can include values for the users who described the product as well as any intent information associated with the reference. Further the product document can also include a relation to a user document, for example, stored in a user database or a relationship graph database 1412. The user database or the relationship graph database can include user documents that include a name for defining a respective user document, and attribute-value pairs describing attributes of user, including for example, relationship information between users. Additionally, user documents can include information on product metadata, reflecting products the respective user has been identified with (e.g., as part of help session generation), products associated with a help session the user has been selected to participate in, commentary generated by the user, NLP processed commentary by the user, commentary from help session conversations the user has participated in, etc. The metadata organized within the user document can also reflect user intent of any captured data. The attribute-value pairs can also include relationship value to other documents, including for example, other users, and product documents.

In some embodiments, user documents can be stored in different databases, each having at least some different information on respective users. For example, the relationship graph database 1412 can capture connections between users. According to some embodiments, the metadata stored in 1412 can also include intent information captured or derived from purchase activity, help session generation or execution, among other options to provide additional detail on how and why particular connections were identified. In some example, the relationship graph database accepts as input system commands "get friend of Tyler" where Tyler is specified by a user identifier (e.g., <user id: 1245>). In response, the relationship graph database can be configured to return a list of IDs that Tyler has a relationship with.

In further embodiments, the affinity and feedback system 1406 can also include a user actions database 1416. The user actions database can define and store information on user actions as user action documents. The user action documents can include attribute-values pairs describing the user action and relationships to other documents (e.g., user documents, product documents, etc). In one embodiment, the user action database records information on purchasing activity. For example, the user action database can store information on user identity, interactions with products, product pages, questions, and respective content and metadata, including for example purchase intent information. In one example, the user actions database is configured to receive as input: store new comment on question specified by a question identifier (e.g., <question id: 7>). The user actions database can also be configured to respond to system queries, providing, in one example, a dump of every question, and all the text of every question, and comment, etc.

As discussed, the affinity and feedback system 1406 can use information stored in the data repositories (e.g., 1412-1416) to mange generation of help session. In one example, the system includes an expert query engine 1418, configured to analyze purchase activity metadata to identify expert users to participate in a help session including for example experts outside of the asker's social connections. The expert query engine 1418 queries the data repositories to identify users related to a topic or product, for example, based on the question defined for a help session or the product/service characteristics identified for a help session.

The expert query engine can rank the users identified by their affinity. According to one embodiment, affinity reflects the relationship between the user and the asker, the product characteristics and the user, the question being asked, the purchase intent defined by the asker or the purchase intent derived by the system in requesting a help session. Each relationship can be weighted based on system values for types of relationship (e.g., valuing user selection of an expert in the same setting over, user identification as a potential answerer) to derive an affinity value and/or score that can be compared to values and/or scores for other users. Affinity values can also be used on an asker's social connections to rank potential answerers for selection by the asker.

According to one example, the expert query engine processes as input 'camera for travel,' optionally including further specification of "I'm looking for a light camera but high quality to take to Brazil for world cup," Tyler asker, specified invitees: Andrew, Joe, David, any received comments (e.g., Andrew—"You're going to Brazil?") to deliver as an output a list of people having affinity to Tyler, travel camera, brazil trip, world cup, etc.

Figure 15:
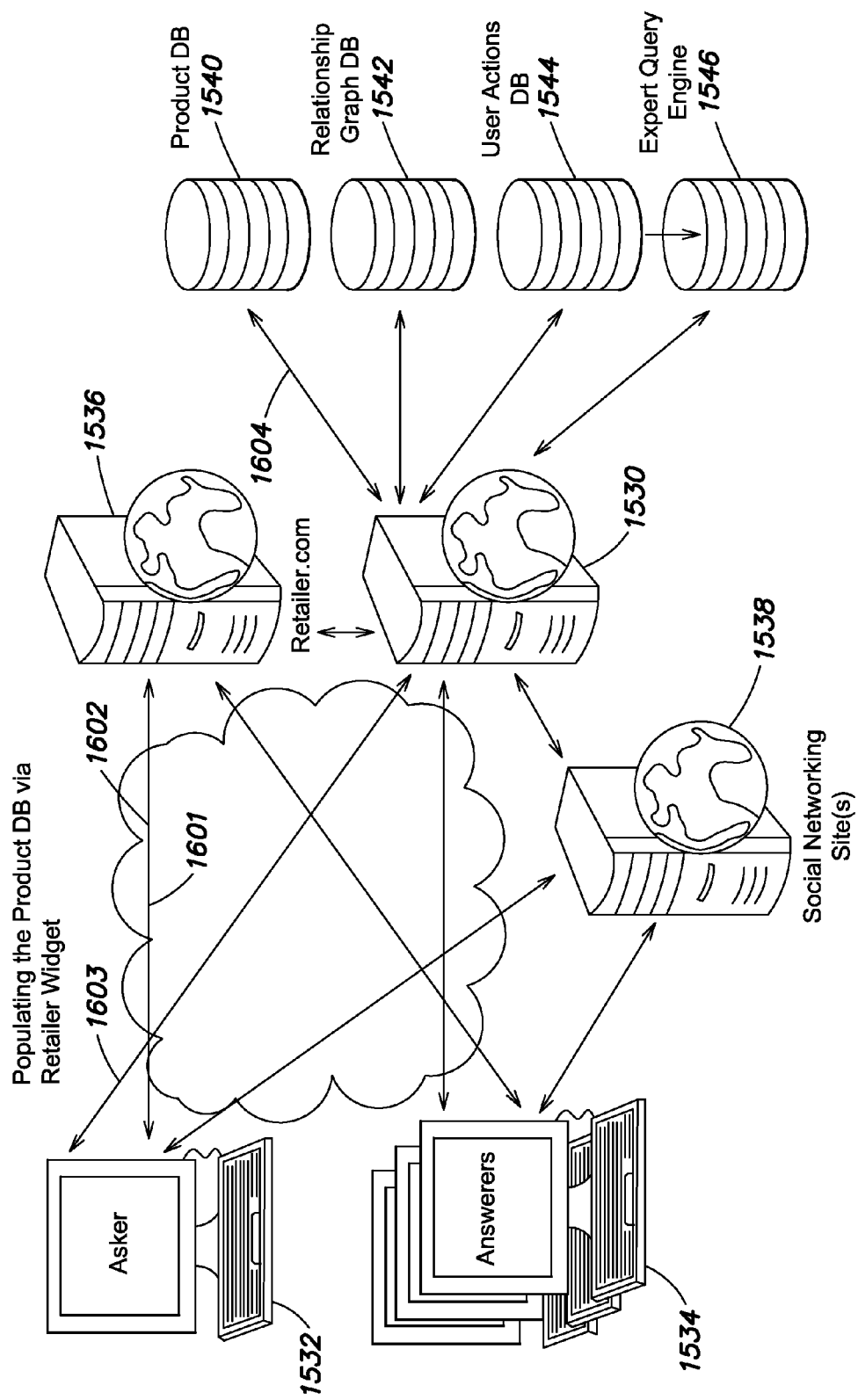
FIG. 15 illustrates example system elements and example data interactions between the system elements.
Figure 16:
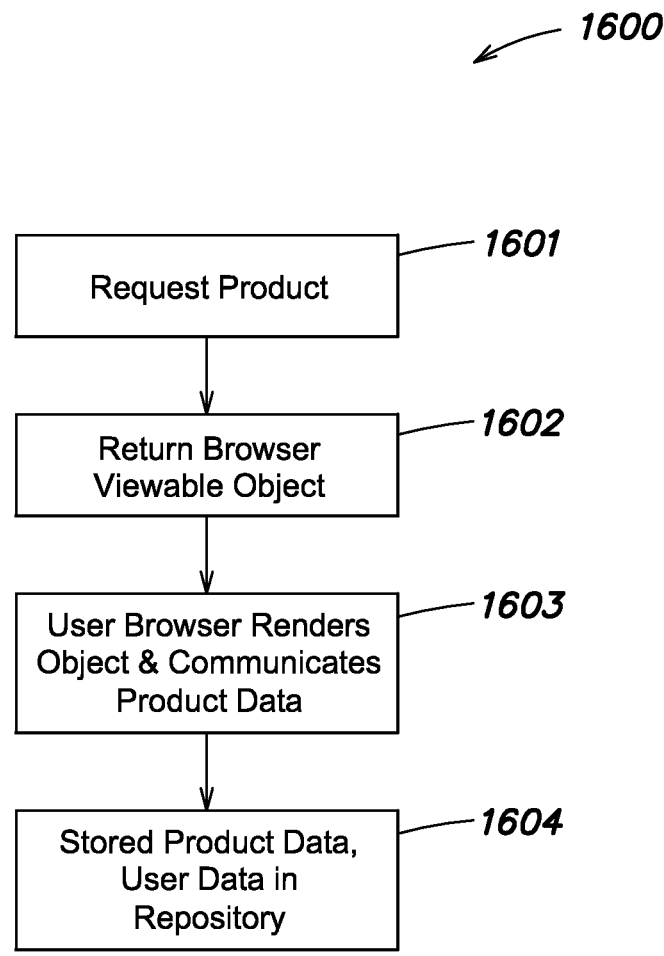
FIG. 16 illustrates an example process flow according to one embodiment.

FIGS. 15 and 16 show an example affinity and feedback system 1530 and the interaction between various elements, system 1530, users (e.g., asker 1532, answerers 1534), e-commerce site(s) 1536, social networking site(s) (1538), at least one data repository (e.g., product DB 1540, relationship graph DB 1542, user actions DB 1544), and engines configured to use the data contained in the at least one repository (e.g., expert query engine 1546). In this embodiment, the e-commerce site incorporates integration scripts configured to communicate with the affinity system 1530 responsive to access to the e-commerce site.

FIG. 16 is an example process flow 1600 for populating the product database of an affinity and feedback system. The process 1600 begins at 1601 with a user accessing an ecommerce site to request a product or service web page using a browser executing on the user's computer system. The e-commerce website returns browser viewable data objects at 1602 that are rendered on the user's computer system through the browser. Within the data delivered from the e-commerce site are references or browser executable code. The references or browser executable code are configured to cause the user's browser to communicate the received data to another system. In one example, the references or browser executable code causes the user's browser to communicate the product or service web page data to an affinity and feedback system at 1603. At 1604 the product or service web page data is stored. In one embodiment, the data is stored in a product database 1540 defining product documents. Additional information can be stored on the user accessing the product information, the e-commerce site from which the information was obtained, etc. Information received can also be stored in other repositories, for example, in a user's database reflecting the user who accessed the product information, and in other examples, can also store information on prior and/or subsequent product information received from the user.

Figure 17:
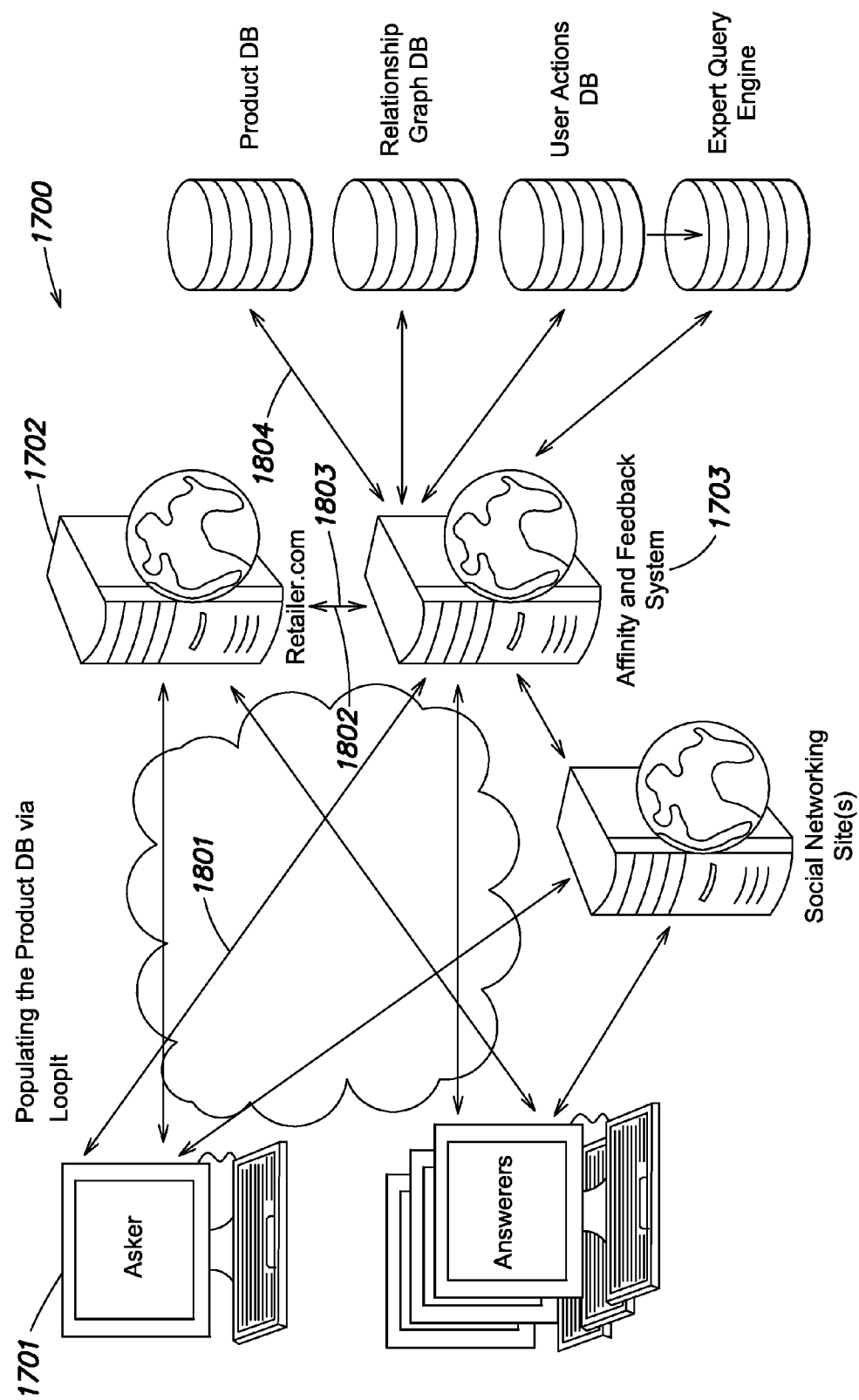
FIG. 17 illustrates example system elements and example data interactions between the system elements.
Figure 18:
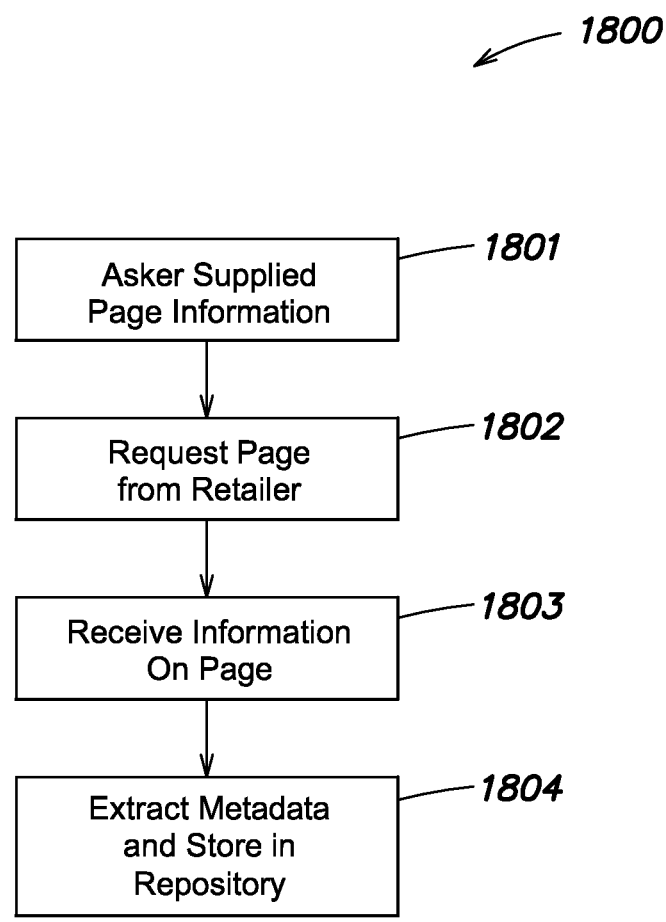
FIG. 18 illustrates an example process flow according to one embodiment.

FIGS. 17 and 18 illustrate an example process flow 1800 and system 1700 for populating a product database. According to one embodiment, process 1800 begins with an asker providing web page information on a product or service at 1801. In some examples, the asker can provide a URL to an affinity and feedback system at 1801. In other examples, the user can click on a visual element in a browser shown on their computer system as they browse an e-commerce website to deliver information on the web page being viewed to the affinity and feedback system. In another example, a client side javascript can monitor asker activity and provide web page addresses and/or information to the affinity and feedback system automatically.

Once the web page information is received, that reference web page is requested at 1802. The information associated with the web page is received at 1803 (including, for example, product description, price, size, characteristics, etc.). At 1804, metadata is extracted and stored in data repositories from the information received at 1803. Additional metadata can be extracted from asker information (e.g., identity, click-steam (i.e., preceding and subsequent page views), purchase intent (if available), etc.) and stored in the data repositories at 1804. FIG. 17 shows the steps of FIG. 18 performed on the various system elements (e.g., 1701-1704).

According to one embodiment, the lightweight scripts can be configured to capture any available metadata, including one or more of suggested price, price, title, brand, color, categories, sku, image—multiple sizes, canonical url, related products, sizes, availability, site, among other examples. The scripts can include, for example, javascript inserted on product pages, and other pages hosted by a web retailer. In some examples, the javascript can be inserted by retailer into the webpage they host for the purpose of integration or in other examples, the javascript can be injected into the site code (e.g., html) by client side plugins.

According to some embodiments, the javascript is executed by every user of that page. The javascript can include variable definition for capturing and/or classifying metadata for a page. In some examples, the javascript can be configured to crawl/walk the page to find metadata through heuristics. In some embodiments, the heuristics executed by the javascript can include identification of a largest image (on a displayed page), known brand names, use of location in page, what is visible on the fold, text treatment (bold not bold, strike through), dollar signs, what is not repeated from page to page (i.e. unique), known domains, and respective page hierarchy, among other options. In further embodiments, heuristics can include execution machine learning processes to establish thresholds for determining product or non-product, canonical image vs site or secondary images. Further heuristics can include processes for the detection of a product page even if the product is included/displayed on more than just product pages. In further examples, the heuristics can be configured to determine the existence of one or more products in a displayed page, identify metatags that indicate user reviews, and/or metatags that indicate a product is being displayed.

In some embodiments, the executed heuristics can determine if a webpage is a product page, a page with multiple products, or a page having no products. Once product information is identified, the javascript can be configured to communicate this data back to the server to deliver the metadata, retrieve a pixel, and/or to retrieve more javascript and html to render a widget. According to some embodiments, this allows real time transfer of the metadata, prices, and/or availability. In some examples, capturing product metadata from hosting sites allows quick update of pricing and availability. In further examples, the capture information reflect true pricing as determined by what is displayed to specific consumers. The consumer pricing information can reflect if different pricing schemes are being implement or is different users received different pricing than internal databases.

In some embodiments, the javascript captures information based on capture and/or tracking pixels. Each of these pixels can be stored in a product DB, uniquely by site and/or sku, title, URL to generate a complete product catalog. The pixels can be used to update the data in the current db if any data changes on a subsequent pixel show. For example, an update of availability and/or pricing can be received frequently, depending on the frequency in change of price and/or availability. Based on data capture executing as user browse third party sites, the system can develop a real time mirror of the site's product catalog and respective metadata form any retailer. In some embodiments, the capture product data and metadata can become an external enumeration of a merchant's products, images, urls, and metadata, and even a catalog hierarchy.

Figure 19:
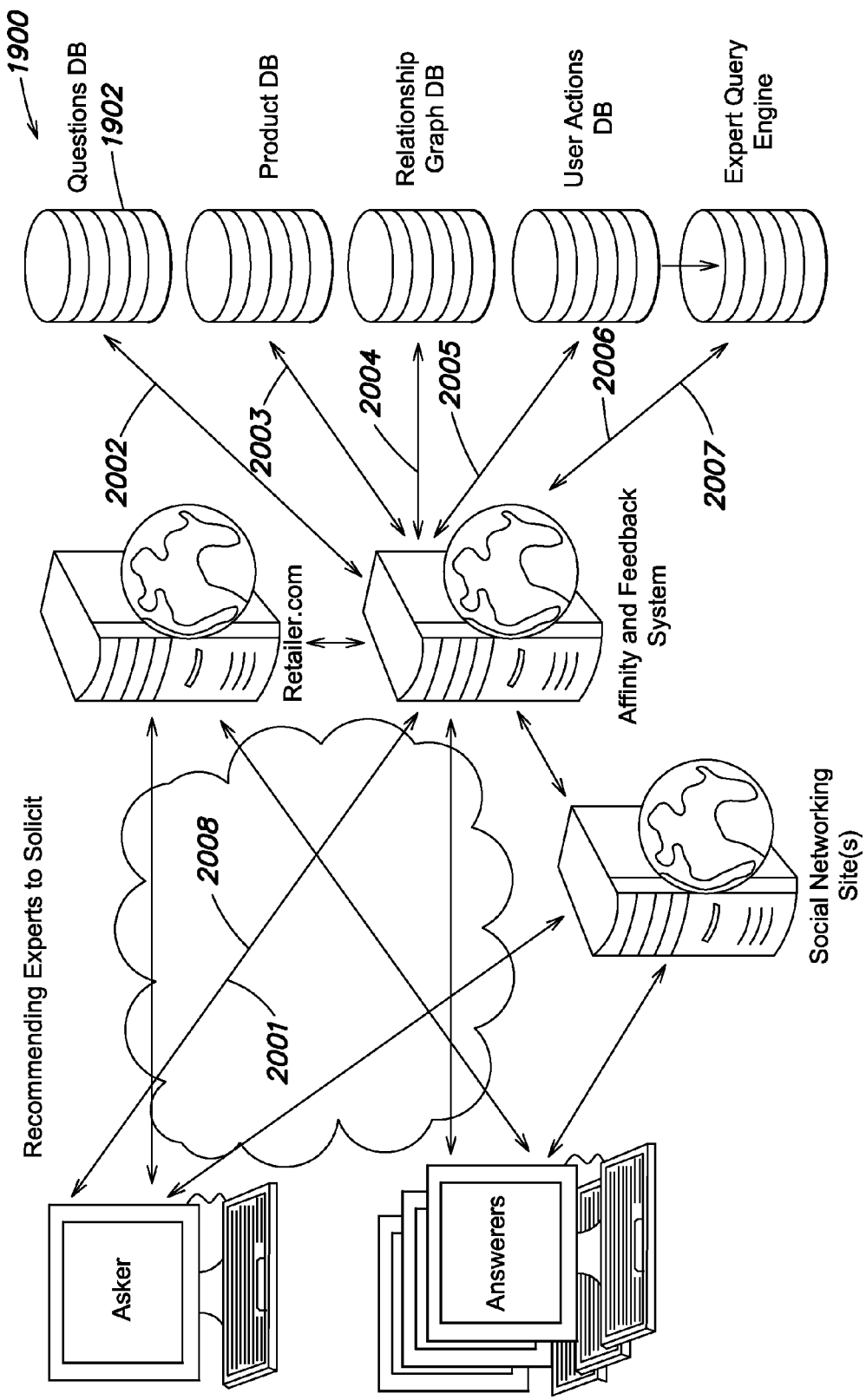
FIG. 19 illustrates example system elements and example data interactions between the system elements.
Figure 20:
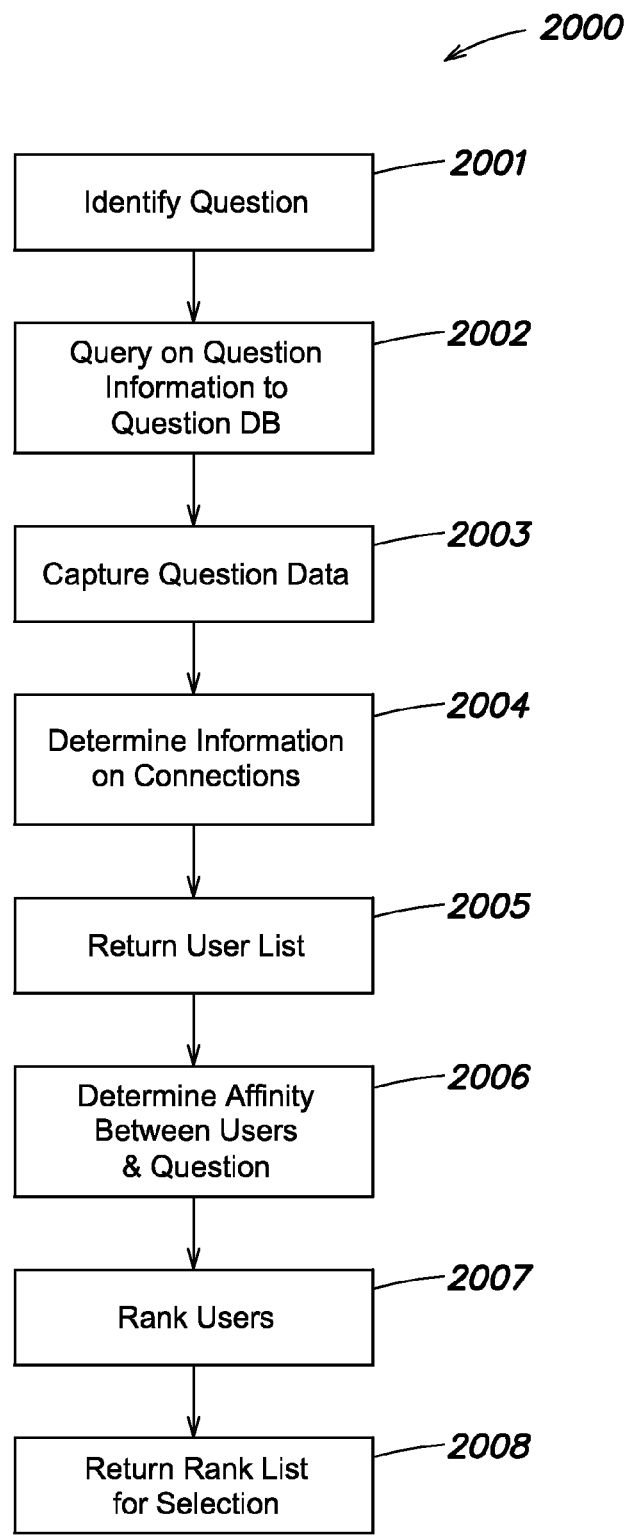
FIG. 20 illustrates an example process flow according to one embodiment.

FIGS. 19 and 20 show another example embodiment of an affinity system 1900 and a process flow for recommending answers to an asker system. System 1900 includes the same elements discussed above for other affinity systems, with the exception of explicitly defining an additional data repository 1902, questions DB. In other embodiments, the information contained in the questions DB can be stored in other repositories or databases, etc. According to one embodiment, the questions DB includes information on question text, comments, products references, product metadata, and users participating as answerers, stored as questions documents. As discussed, in some examples, the questions documents can include relationship to other documents (e.g., user documents, product documents, etc.).

According to one embodiment, process 2000 begins at 2001 with identification of a questions asked by a user/asker. In one example, the asker inputs a question in a text box of user interface display. In another example, the asker can access a help session page including a defined question. Once the question is identified at 2001, a questions database can be queried 2002 to capture metadata associated with the questions at 2003. In one example, a web page having a defined question can include a question ID. The questions DB can be queried for to obtain information associated with the questions ID (e.g., question text, comments, products referenced, product metadata, users' information, etc.). Information about the asker can be used at 2004 to determine information on the askers' connections. In some examples, any uses already identified as answers can be excluded from the relationship query as part of 2004. In some examples, connection queries at 2004 can be explicitly limited to users to which the asker is connected, for example as defined by a relationship DB. A list of users is returned at 2005.

At 2006, the affinity or degree of relationship between the users in the list and any one or more of the question, product, comments, other participants, invited answerers, product titles, metadata for the products, and purchase intent is determined. In one example, a query expert engine can be configured to query the data repositories (e.g., excluding users already invited from the subject query and limiting the query to users having relationships to the asker) with the query targeting any one or more of question title, details of a help request, purchase intent, comments on products/users, conversations between users, other participants, invited answerers, askers connections, product titles, product metadata, among other options. The affinity of each user is determined and used to rank the list of users returned at 2007. At 2008, the ranks results list can be presented to the asker to make further selections of answerers, for example, to participate in a help session.

According to another aspect, various embodiments of an affinity and feedback system can include analytic features for deriving intent based insights into user purchase activity. Shown in FIGS. 21 through 25 are various example screen captures of displays generated by an analytic component of an affinity and feedback system. Shown in FIG. 21 is an example screen capture of insight information generated from purchase activity and associated metadata. In some examples, various commentary during help sessions can be processed and aggregated in trend information. Overall impressions of answers can be generated for each product or service and/or classes of products/service (e.g., 2102). Interesting commentary can be highlighted for review (e.g., 2104). External references can also be provided with their context (e.g., 2106). In some embodiments, conversations and/or commentary can be synthesized into common phrasing characteristics for display (e.g., 2110).

Figure 22:
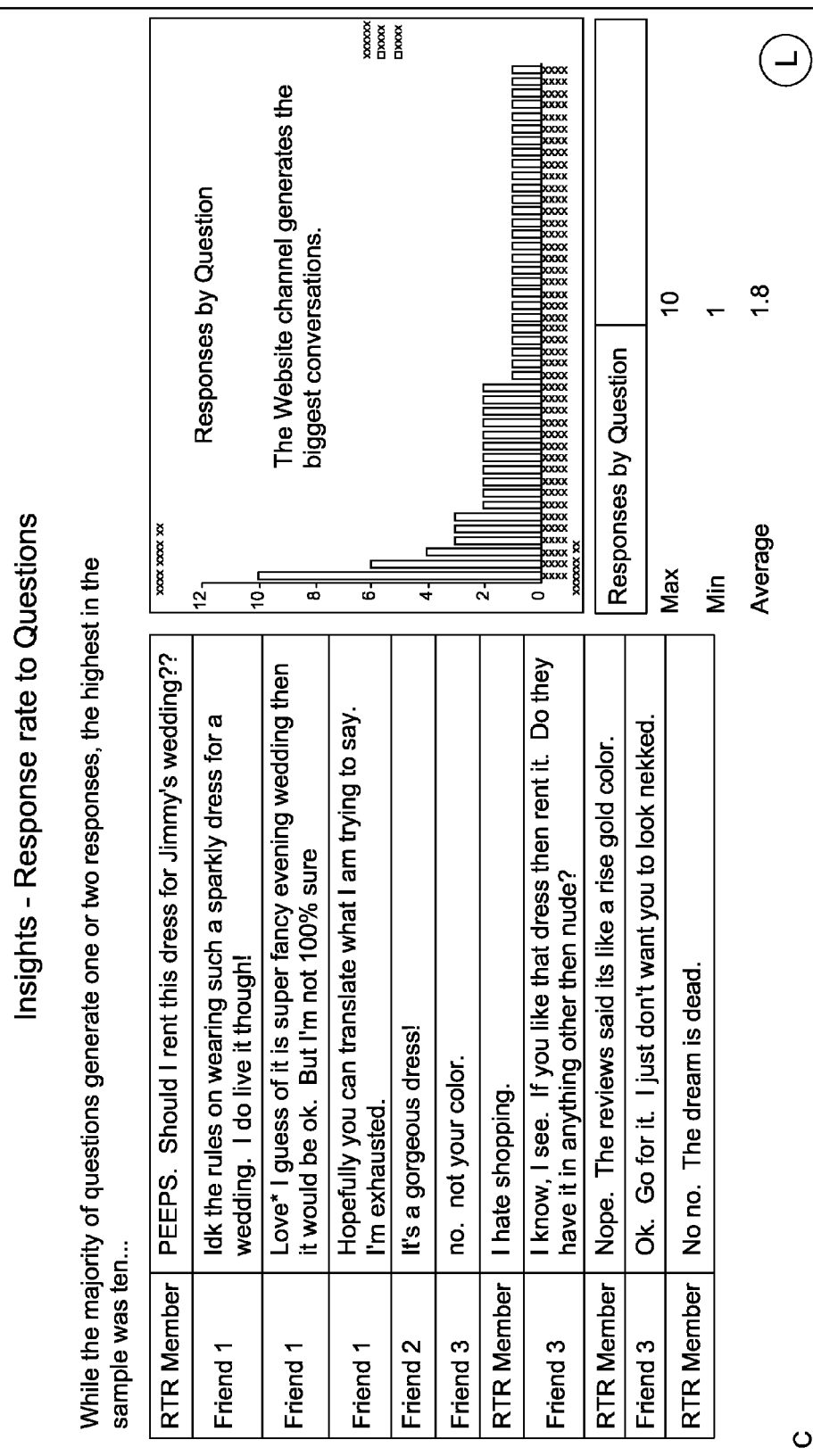
FIG. 22 illustrates a screen capture of an example user interface display, according to some embodiments.
Figure 24:
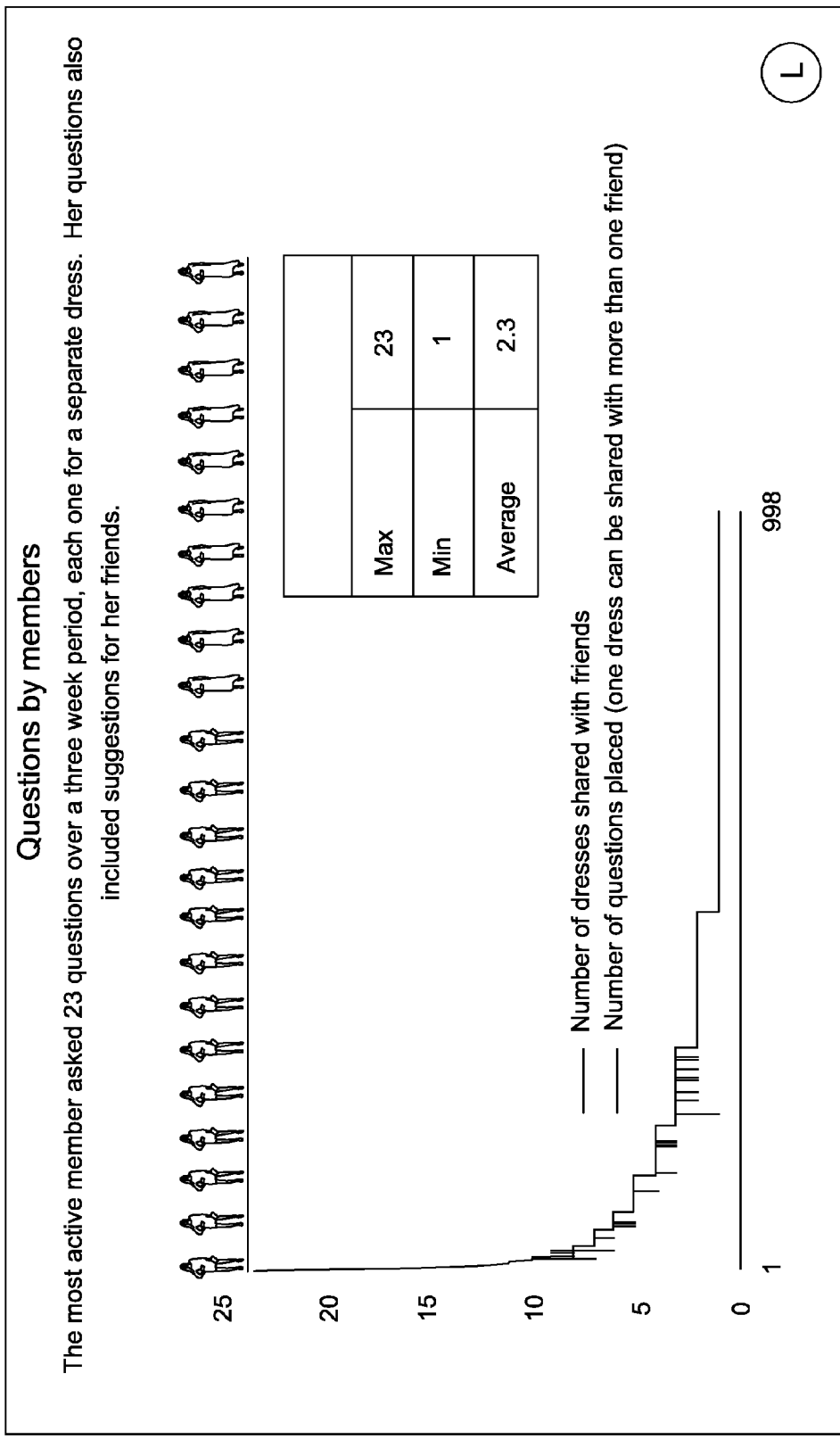
FIG. 24 illustrates a screen capture of an example user interface display, according to some embodiments.
Figure 25:
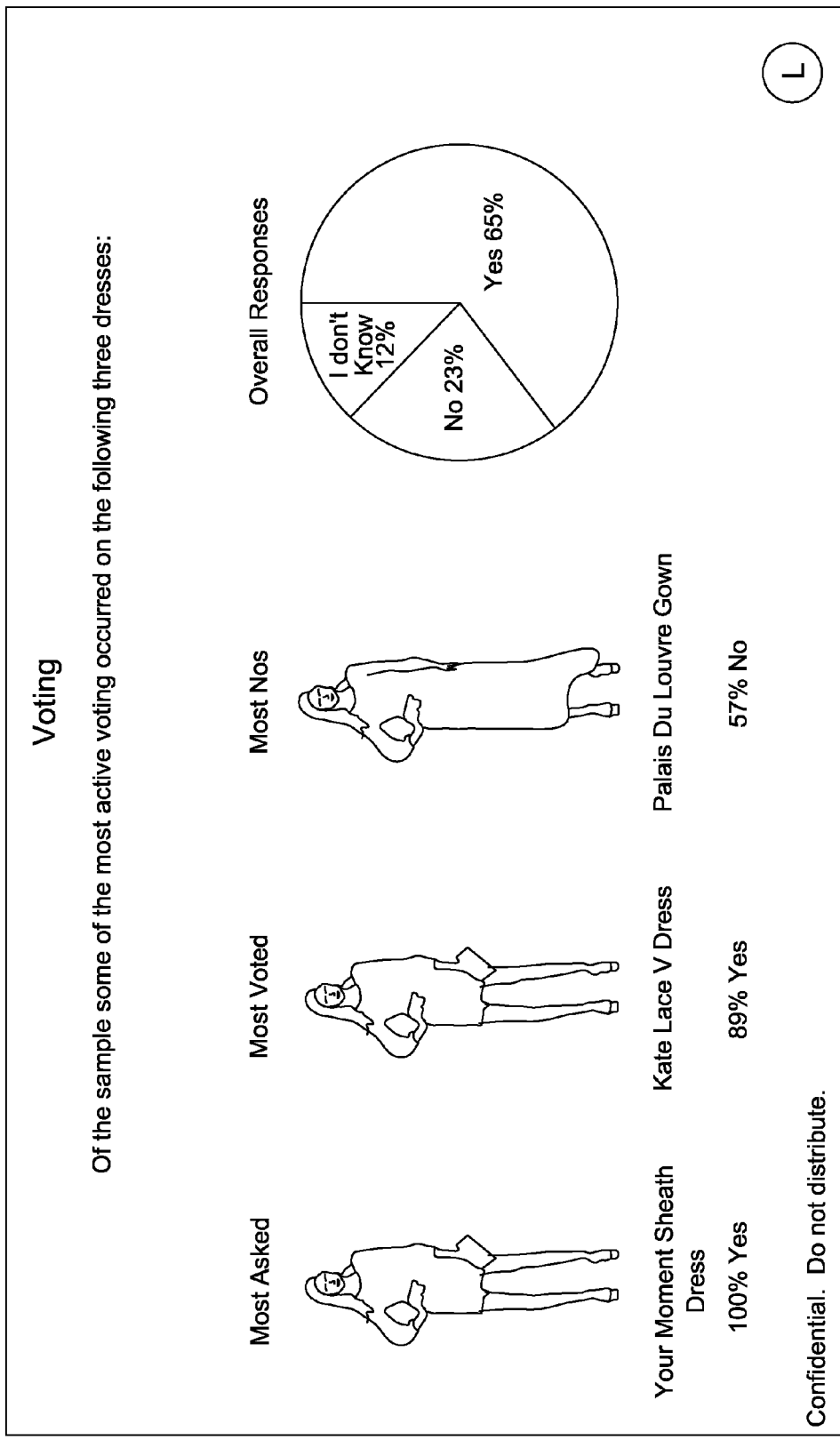
FIG. 25 illustrates a screen capture of an example user interface display, according to some embodiments.

According to other embodiments, additional metrics on help sessions can provide unique insights and purchasing trend information. Shown in FIG. 22 is another example screen capture 2200. Shown is analytics developed on response rates to questions. Further analysis can be provided by the system on responses provided by answerers (e.g., FIG. 23, 2300). Trends across the user base can also be provided (e.g., FIG. 24, 2400 and FIG. 25, 2500).

Figure 26:
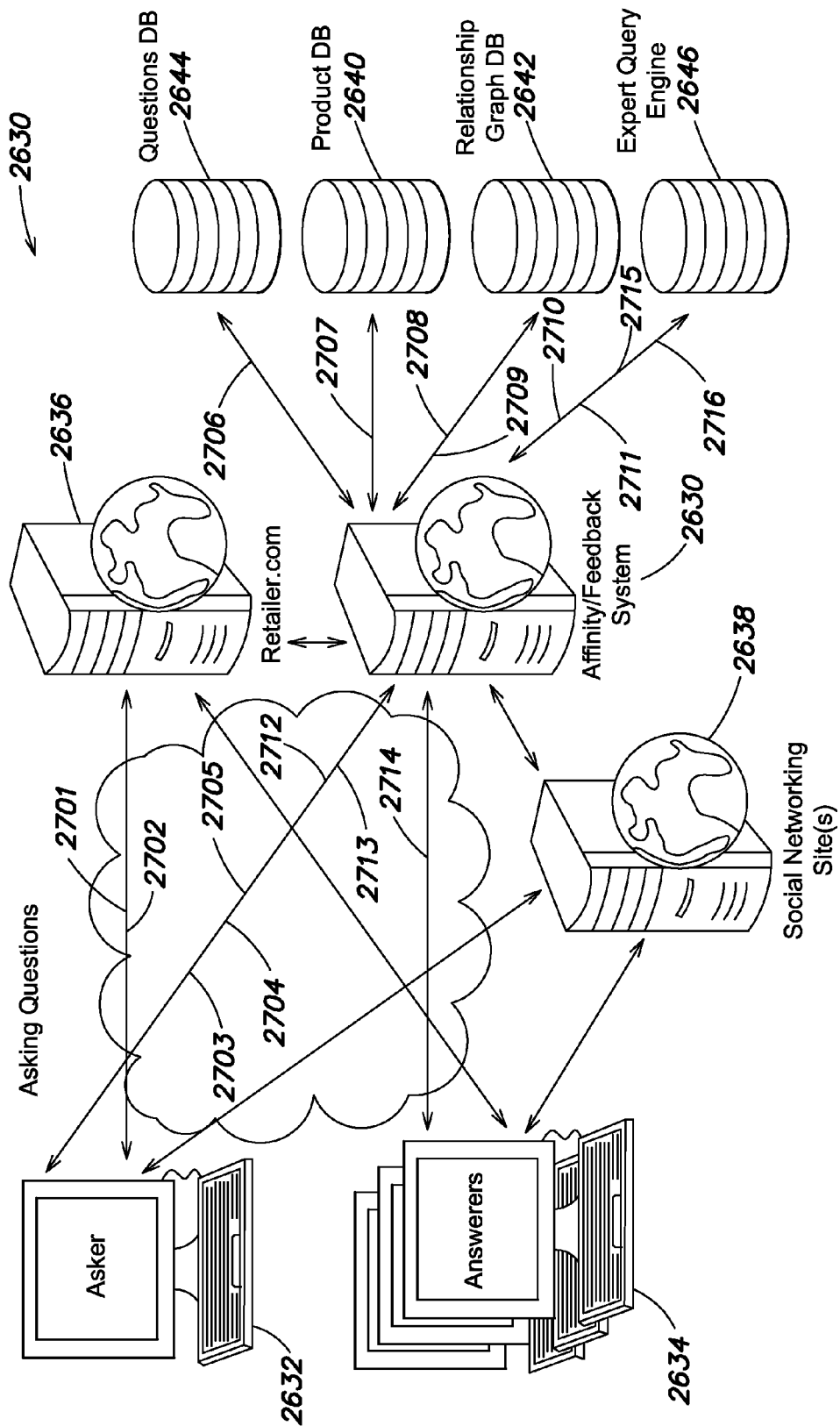
FIG. 26 illustrates example system elements and example data interactions between the system elements.

FIG. 26 shows an example affinity and feedback system 2630 and the interaction between various elements, system 2630, users (e.g., asker 2632, answerers 2634), e-commerce site(s) 2636, social networking site(s) (2638), at least one data repository (e.g., product DB 2640, relationship graph DB 2642, Questions DB 2644), and engines configured to use the data contained in the at least one repository (e.g., expert query engine 2646).

Shown in FIG. 27, is an example process flow 2700 for managing questions, according to one embodiment. As shown, the elements of 2600 perform the steps of flow 2700 (e.g., 2701-2716) in managing asked questions.

Figure 28:
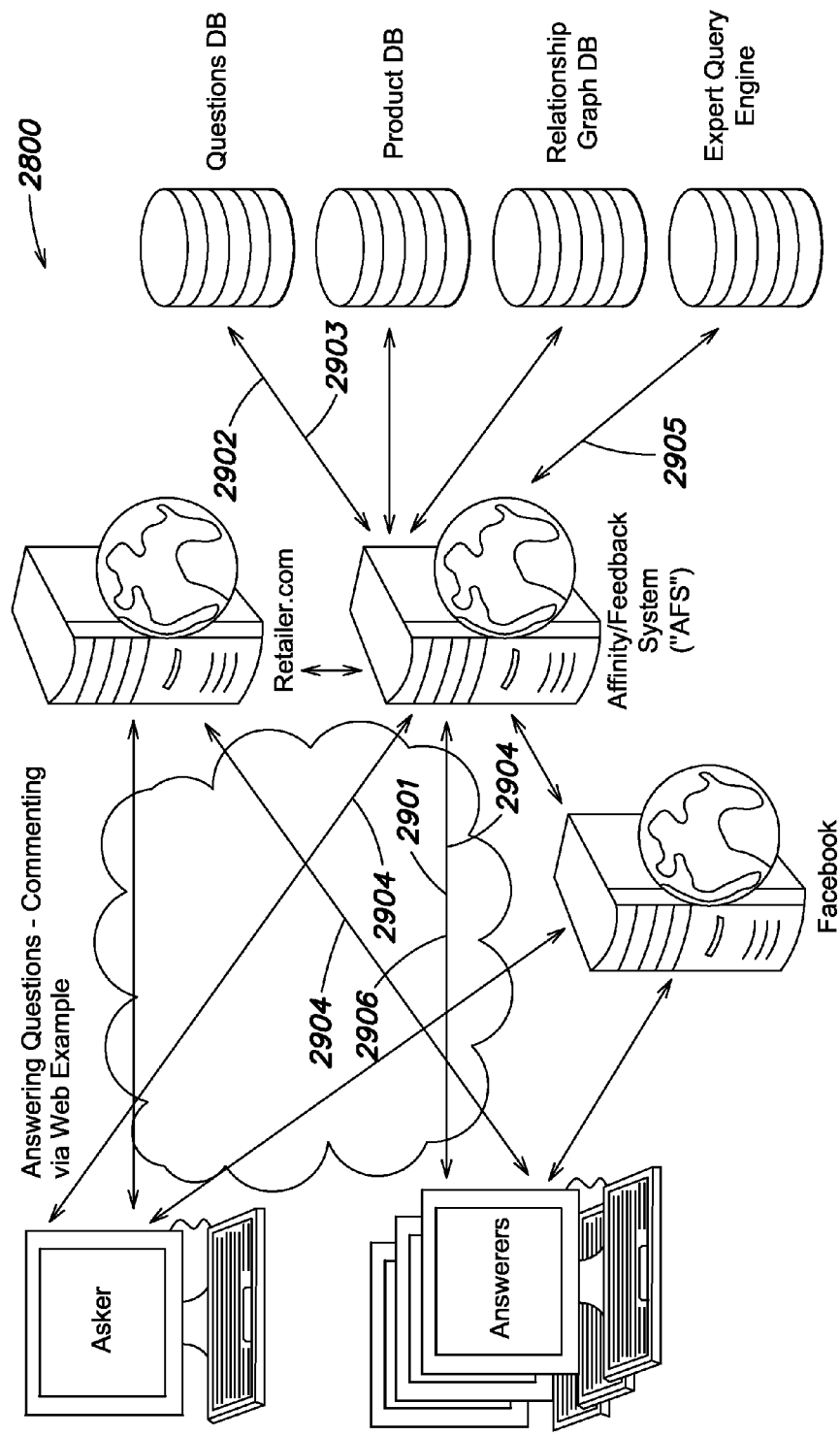
FIG. 28 illustrates example system elements and example data interactions between the system elements.
Figure 30:
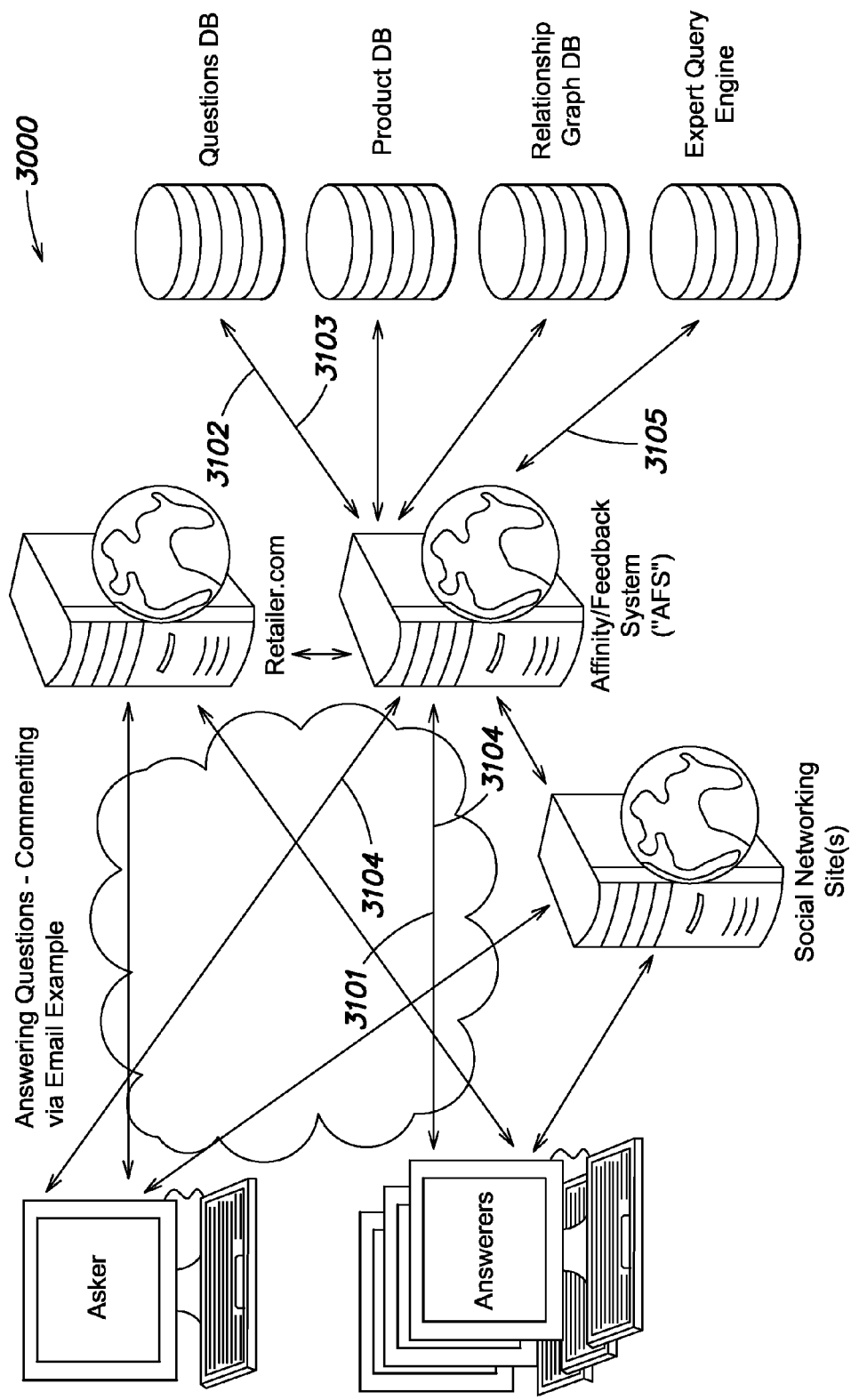
FIG. 30 illustrates example system elements and example data interactions between the system elements.
Figure 32:
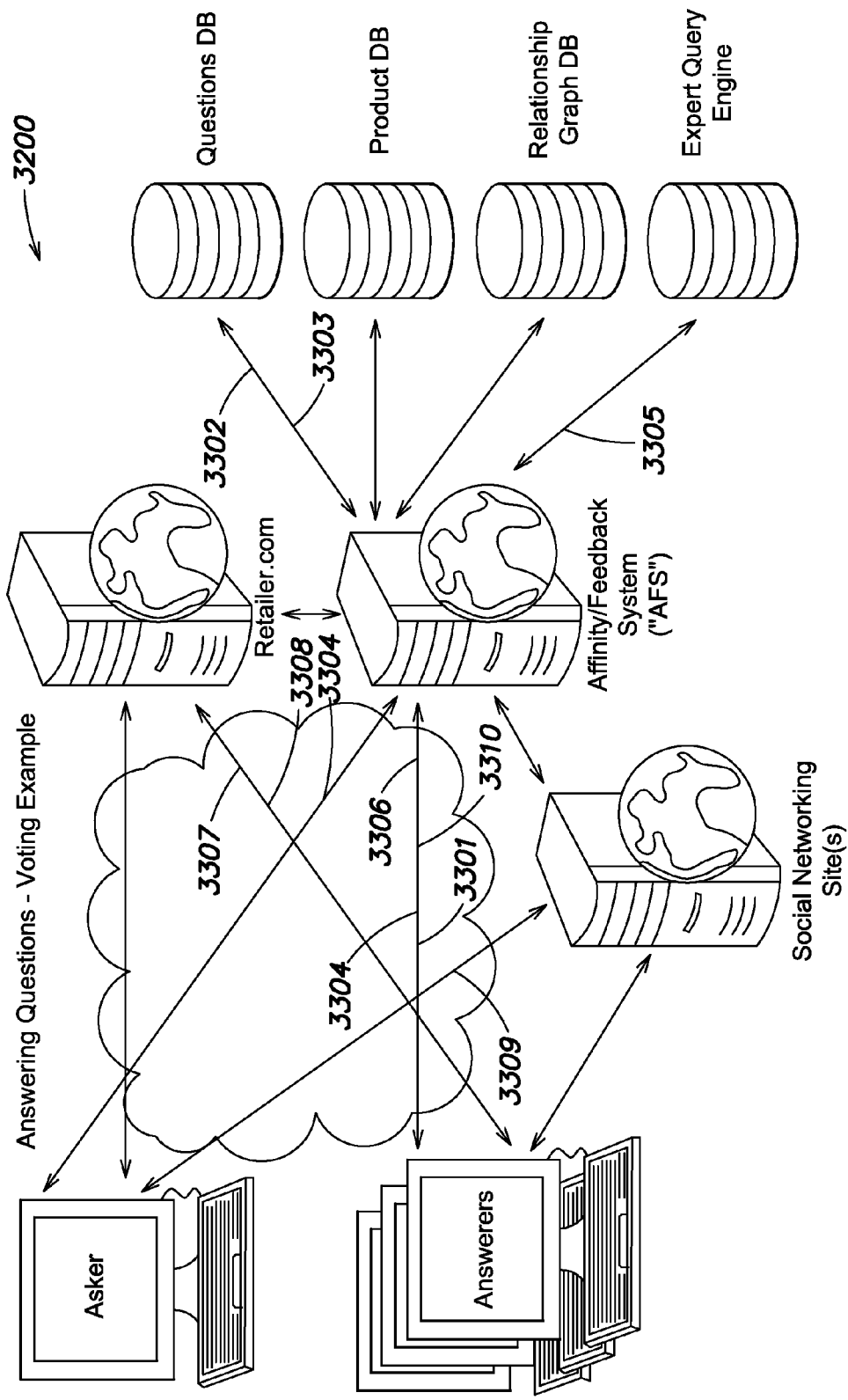
FIG. 32 illustrates example system elements and example data interactions between the system elements.

FIGS. 28 and 29 illustrate an example process flow 2900 and system 2800 for populating a product database. As shown, the elements of 2800 perform the steps of flow 2900 (e.g., 2901-2906). FIGS. 30 and 31 illustrate an example process flow 3100 and system 3000 for delivering comments to participants. As shown, the elements of 3000 perform the steps of flow 3100 (e.g., 3101-3105). FIGS. 32 and 33 illustrate an example process flow 3300 and interactions on system 3200 during execution of process flow 3300. As shown, the elements of 3200 perform the steps of flow 3300 (e.g., 3301-3310). FIGS. 26 through 32 illustrate a variety of implementation examples for processing and interactions between system elements, in other embodiments, the functions and steps performed can be executed in different order, in parallel, or combined into fewer steps or functions. In some embodiments, some features and/or steps can be omitted. Additionally, the system elements illustrated can in some implementations be combined (including, for example, using one or more repositories to house separately illustrated databases) reducing the number of steps perform and altering the interactions illustrated.

According to one aspect, affinity and feedback systems can be configured to implement query functionality and/or search functionality based on a document model of data generated and/or stored on the affinity and feedback system. According to one embodiment, documents are configured to provide a storage unit where one document is associated with one identity. In some embodiment, one document can be broken up across a plurality of databases and each portion of the document includes a relation to other document portions. According to one example, identity can be defined by any one or more of e-mail address and/or Social Network ID for a user document (e.g., Facebook ID, twitter handle, mobile UDID). In one environment, an e-mail address id, for example, can exist on only one document. The system can be configured to merge documents or normalize documents based on e-mail addresses and social network ID. Additionally, the system can be configured to merge e-mail address identified documents with social network ID identified documents based on a determination that the documents reference the same user.

In one example, a document can include free text and structured data. For example, a user document can include free text and structured data associated with a respective user. The free text can include any text information and the structured data can correspond to, for example, structured data fields of retail or people. In one implementation, brand, price, or product category can be defined as structured fields for a product document. In another implementation, city of residence can be a structured field for a user document.

According to one embodiment, an expert query engine can be configured to perform data manipulation operations. The expert query engine can be configured to execute updates and/or inserts on documents stored in any one or more of the data repositories for an affinity and feedback system.

According to one embodiment, the expert query engine can accept as input a unique identifier for a document in a repository (e.g., e-mail id, facebook id, etc.) and data (including, for example, structured and unstructured data to associate with the document or in some example to create a new document). The expert query engine can be configured to accept the input and concatenate the new data with any existing data for an identified document (e.g., user document or product document, etc.).

In one example, the expert engine can receive date captured from a social networking site (e.g., FACEBOOK). In some embodiment, the expert engine can be configured to crawl social networking sites to capture information. Within the social data captured, questions, text, and product information can be detected. In one instance, question text regarding products captured from commentary is referenced by the expert query engine to an asker document. Example commentary can include "What should I wear to Jenny's wedding," "Badgley Mishcka Dress, $300 yellow" each of which can be inserted into document corresponding to the user providing the comment as well as the user receiving the comment. The question text and products referenced can likewise be inserted into user documents associated with the commentator and/or the recipient. For example, participants in a help session (i.e., invited users) can also be tagged based on commentary generated by the inviting user and/or commentary received by the inviting user on a social networking site.

The expert engine can also be configured to merge information contained in the various repositories. In one implementation, the expert engine merge queriable data on an asker, question text, products, invited users, constrained by any limit. In one example, a merge operation can be received by the expert engine specifying as inputs any one or more of: asker (e.g., id of asker), question text, (e.g., free text to match), products (e.g., product name, product id, products referenced), invited (e.g., ids of any users invited for a help session), and defined constraints (e.g., specification of exclusions, who not to return and/or count). In response, the expert engine can be configured to return a list of user IDS ranked by affinity to a given question, product, context, etc. In one example, for a merge operation delivered as part of generating a help session the user IDs can be ranked based question/product affinity.

According to some embodiments, ranking operations can include broadly capturing information on which to evaluate affinity. For example, the expert query engine can be configured to employ various combinations of free text search using products and question text against data repositories (e.g., a document store) and refinement options defined. The return data can then be ranked using search engine style ranking functions and/or operations. One example includes ranking by term frequency. The data capture can include the use of spell correction, stemming, other known search augmentation approaches. Further, the ranking on term frequency can likewise account for spelling correction, stemming, etc.

According to some embodiments, various insights can be captured from ranking of users and/or products. For example, the more questions someone asks, the more their term frequency will be affected generating a higher ranking. In another, the more that someone is asked to participate in answering a question of a certain type, the more their term frequency will be affected generating a higher ranking for similar questions. In yet another, the more that someone responds to questions of a certain type, the more their term frequency will be affected generating a higher ranking for similar questions.

In other embodiment, ranking can be used to promote users as experts, for example, in displays for generating help sessions. In addition to term frequency ranking operations can include spelling stemming functions, concept extraction functions, and structured data search functions to allow for ranking a promotion of users on "near" associations. Near associations can be determined on question data, user data, concept data, product data, their combinations, among other options. In one example, a user Tyler asks about Bicycles during a help session. When his friend Jonathan asks a question about a "Bike," Tyler can be promoted based on stemming analysis.

According to other embodiment, the functions discussed with respect to the expert query engine can be executed by other system components or more generally by the system itself. For example, an affinity engine (e.g., 104) can implement the functions described, further an affinity component (e.g., 112) can implement the functions described for the expert query engine, among other options.

Example Use Cases

According to some embodiments, affinity and feedback systems can include options for generating and/or delivering recommendations regarding users to facilitate help sessions. In one example, recommendations generated by the system can employ gender as a filtering criteria, as a weighting criteria, or as one facet in a multi-faceted ranking analysis. In some embodiments, product categories identified by the system can be associated with specific weightings for gender. In one example, product categories including "dresses," can include weightings for recommending women over men within the specified product category. Gender weighting can also be implemented for specific products, as well as product categories.

According to some embodiment, connection discovery can include capture of e-mail information (e.g., from e-mail services or from user specification of e-mail addresses). Some embodiments include features for specifying e-mail addresses. Once specified, the system can request external services to provide meta data, which can include gender, location, geo-position, etc. to gather info similar to information provided by the operation of social networking sites like FACEBOOK.

According to another embodiment, recommendation generation and/or delivery can be facilitated through and in conjunction with affinity and feedback systems. In one implementation, ad targeting is directed by a recommendation system based on what someone else invites you to or "Says about you." In one example scenario, on a web page (including for example, a retailer site) a user specifies (by clicking or adding emails) others to send messages (e.g., help requests). In response to the requests, the system is configured to tag those user profiles with the metadata associated with the web page. The system can then be configured to Ad Target those users with ads, responsive to the metadata information, and leveraging the understanding that that those users may have affinity to said metadata, and in some examples, the ad delivered may also relate to that metadata as well.

According some embodiments, help session questions can be triggered through a variety of channels. In one embodiment, help session questions can be defined from "second screen" mobile applications. For example, viewing activity of a user can be monitored to enable users to ask questions of their connections based on the user's viewing of another screen (i.e. the "second screen"). In one example, the system provides users the option to ask questions and/or pose a question to their connections about products from a television program while watching it.

According to other embodiments, mobile styled applications can be implemented as part of an affinity and feedback system. In one embodiment, a mobile application executing on a user's smart phone or tablet can capture location based information (e.g., store location, specific store, mall, etc.) and incorporate a current location into a help session as context information. In one example, a user can take an image of a product at a real world store to begin definition of a question and/or a help session. The image capture can also provide location based information, including, for example, information on the store the user is in. Various embodiments of mobile application can also be configured to capture video and/or audio information to generate context for a question and/or help session. Video and/or audio processing can identify, for example, that the user is watching a commercial about Dyson vacuums. The user can select an option within the mobile application to "Ask Friends" which can trigger capture of context information or trigger processing of context information.

In one embodiment, the affinity and feedback system is configured to accept images to define a help session and/or begin asking a question to their connections. In one example, a mobile application is provided that enables question/help session definition by capturing an image and then notifying friends. In another example, the user can use SMS, email, etc., to notify their friends of the request. In the mobile context, the user can select a product by asking via a web-page, however, the user can also take a photo, and use SMS/email/or in application notifications to invite their friends to answer their question.

As discussed ranking of connections can occur using search engine approaches. For example, users can be ranked using searches for relationships within data on the user's connections and promoting people within the results based on degrees of relationship. Where available data is sparse or non-existent, connections can be ordered, for example, based on mutual friend counts declining (e.g., as obtained via FACEBOOK for example). Additionally, random ordering of friends can also be implemented. The ranking/ordering approaches can be used in combination, for example, to break ties from the search solution.

According to implementations, the system can also be configured to scale across a variety of sites, retailers, etc. In some embodiments, the system implements a memcache architecture, with the caching of purchase content, log files, and execution of batch processing to accomplish scalability across a number of retailer sites and/or capture of connection information. In one embodiment, a memcache (a server module) is deployed between the web server and the database to reduce database load. In one implementation, the product db, for example, is implemented via log and post processed (e.g., at regular intervals like hourly/daily) to load data into the product db. Dynamic data can be captured via log files and integrated into repositories on the system via batch processing. In some embodiments, system activity is processing and/or updated via batch processing. For example, the system can update the expert DB at hourly intervals so that actions may not immediately effect the expert db, can rather are present upon re-index which can occur on an hourly cycle. Other batch processes can be executed by the system to process data, including for example, batch processing of mail. For example, "reply to"

the help requests can be delivered by e-mail, and the system can "check mail" from the mail server on an hourly basis. Purchase, activity, and other analytic data can be computed via batch processing as well. In one example, the system computes analytics on a daily basis through a batch job mining the logs.

In further embodiments, the system can integrated with retailer provided programs. The retailer provided program can include for example, loyalty reward programs. Loyalty programs can be used to deliver points when connection, shoppers, etc., purchase good subject to questions. Point may be awarded and/or limited to specific time frames. In some embodiment, the system implements virtual currency through retail reward programs. In other embodiment, the system provides an independent virtual currency that can be used within the system.

Figure 34:
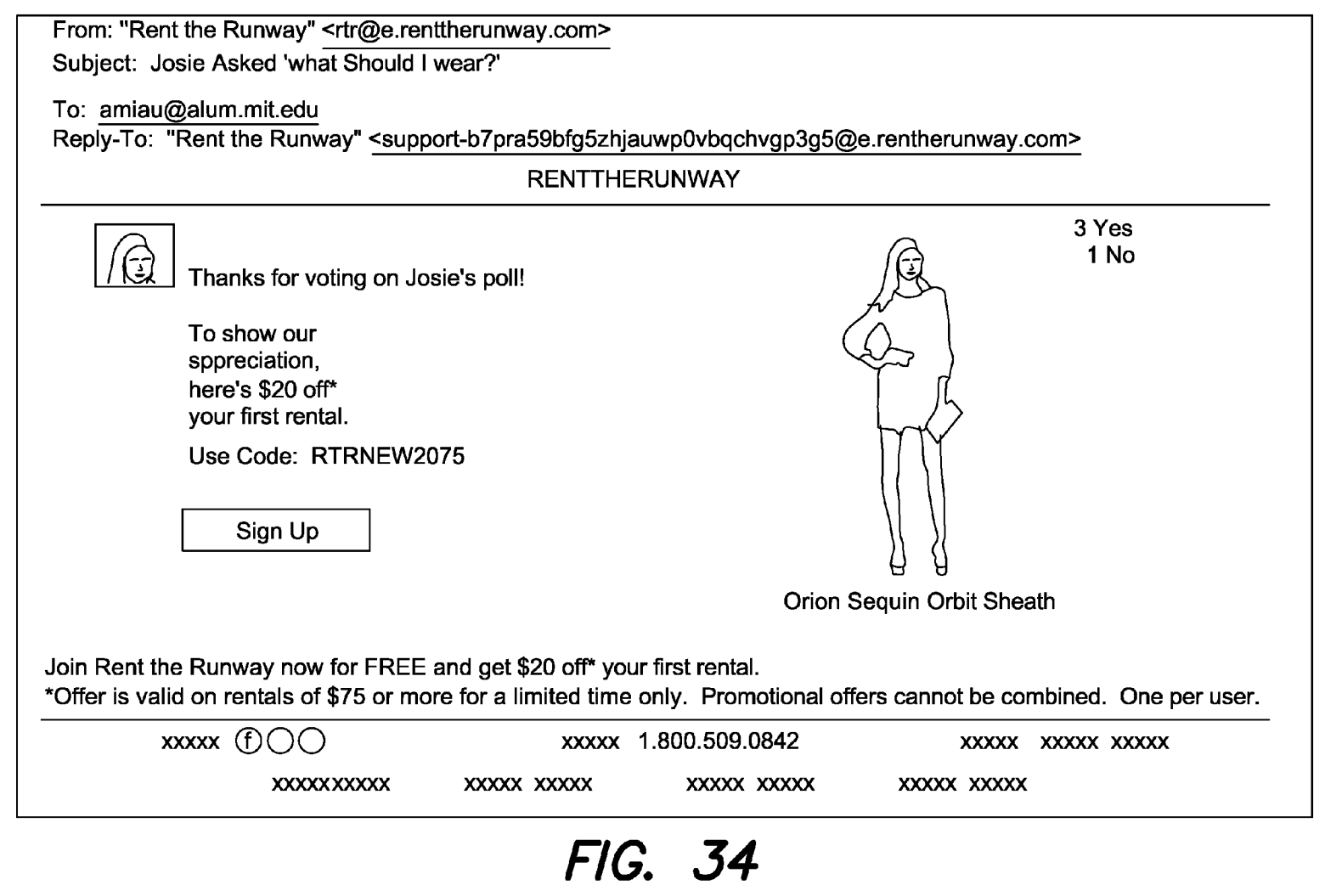

According to another embodiment, the system can also provide for re-marketing to helpers by offering them "Thank You notes." For example, in response to helping, participants receive discounts, and coupons. FIGS. 34 and 35 show examples of re-marketing objects delivered to participants via e-mail. In some implementations, the system is configured to analyze the participation of a user within a help session to tailor a re-marketing object to the preferences of the user. In one example, the products discussed within the help sessions can be specifically highlighted within a communicated re-marking object (see FIG. 34). In addition, contextually relevant information can also be delivered (e.g., including images of the product purchased by the asker, products considered during the help session, among other options). In further embodiment, the participating user is analyzed on their connections and affinities within their networks to define display options within a re-marketing object. FIG. 35, illustrates another example of a re-marketing object generated by the system.

Example Computer Implementations

Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 6:
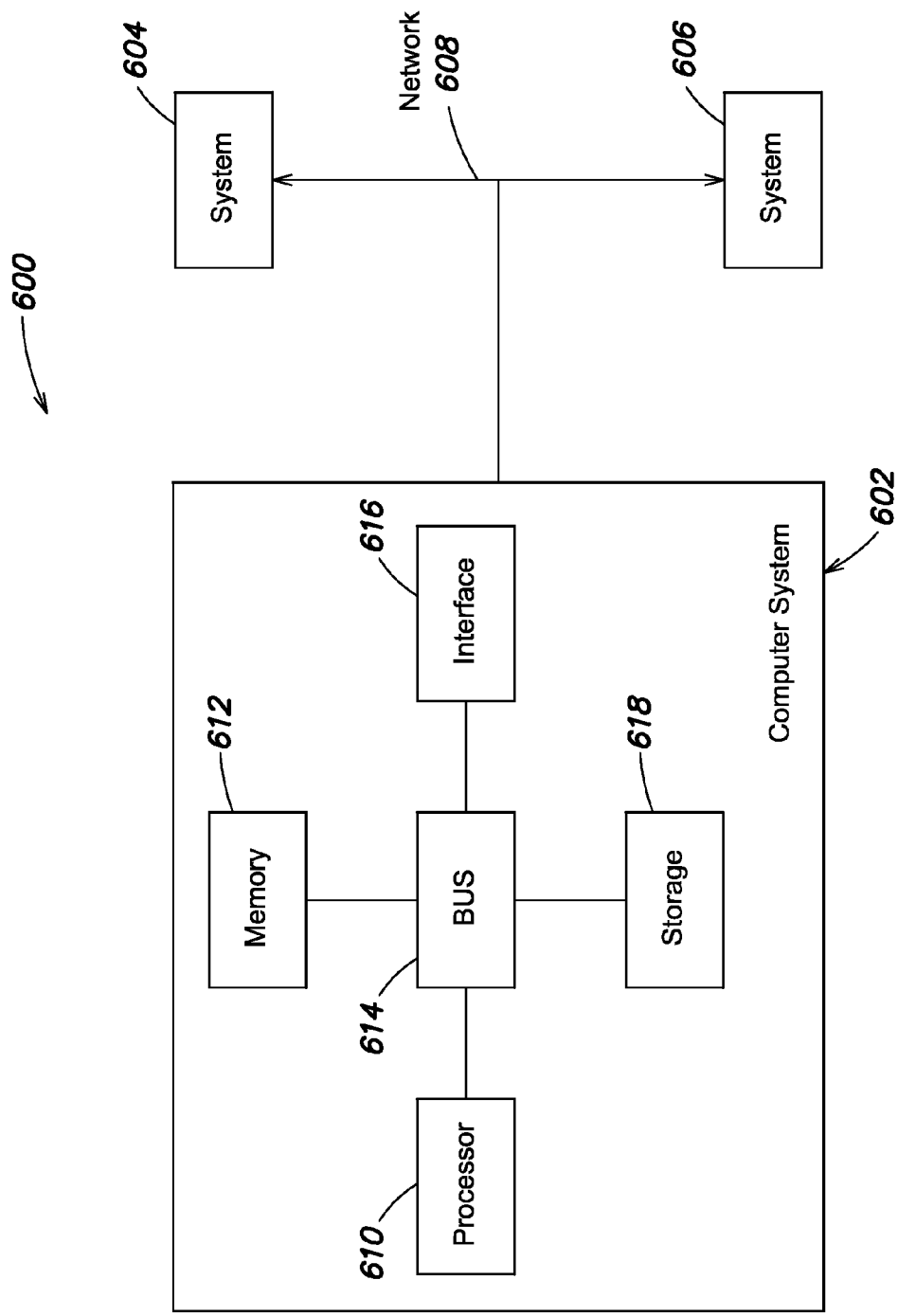
FIG. 6 is a block diagram of one example of a computer system that may be used to perform processes and functions disclosed herein.

FIG. 6 shows a block diagram of a distributed computer system 600, in which various aspects and functions in accord with the present invention may be practiced. The distributed computer system 600 may include one more computer systems. For example, as illustrated, the distributed computer system 600 includes three computer systems 602, 604 and 606. As shown, the computer systems 602, 604 and 606 are interconnected by, and may exchange data through, a communication network 608. The network 608 may include any communication network through which computer systems may exchange data. To exchange data via the network 608, the computer systems 602, 604, and 606 and the network 608 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 602, 604 and 606 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 604 and other computing devices in the network.

To ensure data transfer is secure, the computer systems 602, 604 and 606 may transmit data via the network 608 using a variety of security measures including TSL, SSL or VPN, among other security techniques. While the distributed computer system 600 illustrates three networked computer systems, the distributed computer system 600 may include any number of computer systems, networked using any medium and communication protocol.

Various aspects and functions in accord with the present invention may be implemented as specialized hardware or software executing in one or more computer systems including the computer system 602 shown in FIG. 6. For example, system 602 can executed functions for person-to-person discovery of products/product characteristics using social connections, specifically in ecommerce environment/transactions (e.g., responsive to "Ask For Help"/"Poll for Opinions"/"Seek Advice"), including soliciting advice/opinions from qualified social networks (and can include strangers related by other affinity characteristics), intent/content based discovery, end-to-end data capture, tracking, and management.

In addition system 602 can be configured to generate and analyze metadata, including generation of metadata for people (e.g., build people profiles responsive to being selected for Help Request (e.g., tag users with metadata of the products being vetted on the Help request)), defining people/users as documents, generate meta data on products (including, for example, building product profiles to include user information responsive to help requests (e.g., tag products with user meta data from Help Request)), defining products and/or product Characteristics as documents, and to capture purchase intent.

In further embodiments, system 602 can also be configured to generate an execution platform (e.g., web-page) for executing help requests between users, capture user dialogue and analyze dialogue to provide user meta data and product meta data, including, for example, analyzing dialogue to provide new metrics for generating recommendations/targeting etc., providing a purchase intent per page model, organizing of help request information, storing information on people as documents containing all the meta data (e.g., based on their selections in a help group, their identification for inclusion in a help group, association with a product being reviewed/product characteristic, etc.) with products as body text of the document, storing information on products as documents containing all the meta data derived from help requests, including, for example, with people as body text of the document.

In yet other embodiments, system 602 can also be configured to generate a catalog of products using discrete transactions, including build up a provider's entire catalog (e.g., product catalog or e-commerce site) responsive to help requests submitted, and/or tracking of each product visited with lightweight scripts (e.g., javascripts) that eventually capture an entire product catalog for a retailer. In some implementations, system 602 can provide recommendations and marketing functions, including, for example, delivery of intent based recommendations and marketing based on intent, marketing to a shopper through affinity ranked connections to the shopper, aggregation of responses to help questions and marketing/recommendations based on that aggregated information, and prediction of timing of execution of a purchase based on intent and context information collected on users and/or user connections.

As depicted, the computer system 602 includes a processor 610, a memory 612, a bus 614, an interface 616 and a storage system 618. The processor 610, which may include one or more microprocessors or other types of controllers, can perform a series of instructions that manipulate data. The processor 610 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 610 is connected to other system placements, including a memory 612, by the bus 614.

The memory 612 may be used for storing programs and data during operation of the computer system 602. Thus, the memory 612 may be a relatively high performance, volatile, random access memory such as a dynamic random access memory (DRAM) or static memory (SRAM). However, the memory 612 may include any device for storing data, such as a disk drive or other non-volatile storage device, such as flash memory or phase-change memory (PCM). Various embodiments in accord with the present invention can organize the memory 612 into particularized and, in some cases, unique structures to perform the aspects and functions disclosed herein.

Components of the computer system 602 may be coupled by an interconnection element such as the bus 614. The bus 614 may include one or more physical busses (for example, busses between components that are integrated within a same machine), and may include any communication coupling between system placements including specialized or standard computing bus technologies such as IDE, SCSI, PCI and InfiniBand. Thus, the bus 614 enables communications (for example, data and instructions) to be exchanged between system components of the computer system 602.

Computer system 602 also includes one or more interfaces 616 such as input devices, output devices and combination input/output devices. The interface devices 616 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 616 allow the computer system 602 to exchange information and communicate with external entities, such as users and other systems.

Storage system 618 may include a computer-readable and computer-writeable nonvolatile storage medium in which instructions are stored that define a program to be executed by the processor. The storage system 618 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 610 or some other controller may cause data to be read from the nonvolatile recording medium into another memory, such as the memory 612, that allows for faster access to the information by the processor 610 than does the storage medium included in the storage system 618. The memory may be located in the storage system 618 or in the memory 612. The processor 610 may manipulate the data within the memory 612, and then copy the data to the medium associated with the storage system 618 after processing is completed. A variety of components may manage data movement between the medium and the memory 612, and the invention is not limited thereto.

Further, the invention is not limited to a particular memory system or storage system. Although the computer system 602 is shown by way of example as one type of computer system upon which various aspects and functions in accord with the present invention may be practiced, aspects of the invention are not limited to being implemented on the computer system, shown in FIG. 6. Various aspects and functions in accord with the present invention may be practiced on one or more computers having different architectures or components than that shown in FIG. 6. For instance, the computer system 602 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 602 may include an operating system that manages at least a portion of the hardware placements included in computer system 602. A processor or controller, such as processor 610, may execute an operating system which may be, among others, a Windows-based operating system (for example, Windows NT, Windows 2000/ME, Windows XP, Windows 7, Vista, or 8) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for generating product catalog information, the system comprising:
   at least one processor operatively connected to a memory;
   an affinity engine executed by the at least one processor, configured to:
   receive, from a receiver, a plurality of tracking communications, from at least one browser monitor process configured to capture user browsing activity, responsive to a user accessing at least one third party e-commerce site;
   wherein the at least one browser monitor process is further associated with a plurality of tracking code elements, wherein the plurality of tracking code elements are added to one or more client browser environments or provided to one or more third party online websites, wherein the plurality of tracking code elements are configured to:
   capture information responsive to identifying a product being accessed on the at least one third party e-commerce site and further configured to:
   capture product characteristics and the product being accessed responsive to identifying the product being accessed;
   identify through execution heuristics that a consumer product is being viewed on a web-page, wherein the execution heuristics during execution are configured to evaluate any one or more of the following characteristics to the identify the consumer product:
   a largest image displayed on a webpage,
   use of location in the displayed page,
   content visible at a fold position,
   textual treatment of displayed content,
   textual symbols including dollar signs displayed,
   comparison of prior pages to current page to identify unique content, known domains and page hierarchy,
   thresholds to determine canonical image or secondary image,
   embedded product content in a page wherein the embedded product content is displayed outside of a product description page,
   page content including user reviews,
   multiple products on a page, and
   identify one or more site or merchant identifiers for the product being accessed;
   identify and capture product characteristics from the received user browser activity contained within the plurality of tracking communications;
   store site or merchant identifiers in association with a product document for each product identified from the product characteristics, wherein the product document includes a data structure for defining a unique identifier for the product and product characteristics wherein the product document data structure further comprises attribute-value pairs describing attributes of the document, wherein at least one attribute-value pair in the data structure defines a relationship between the product and any one or more of: users commenting on the product, shopping for the product, asking questions about the product, and wherein the attribute-value pairs are configured to reference other documents in other repositories, including, references to user documents comprising attribute value-pairs describing the users who accessed the product being tracked;

wherein the affinity engine is configured to generate, independently from the at least one third party e-commerce site, a digital product catalog of products for a plurality of merchants or a plurality of websites responsive to aggregating the plurality of tracking communications.

2. The system according to claim 1, further comprising the at least browser monitor process installed and executing on a user's local computer system.

3. The system according to claim 2, wherein the at least one browser monitor process automatically identifies and communicates product information from web-sites accessed by the user.

4. The system according to claim 2, wherein the at least one browser monitor process identifies and communicates product information from web-sites accessed by the user responsive to user selection.

5. The system according to claim 1, further comprising the at least one browser monitoring process, wherein the at least one browser monitor process is installed and executing on the at least one third party e-commerce site.

6. The system according to claim 5, wherein the at least one browser monitoring process is downloaded to the user's computer system as browser executable code as part of a web page served to the user's computer, and executes in response to the user viewing the webpage.

7. The system according to claim 1, wherein the system is configured to store the product characteristics as metadata associated with respective products.

8. The system according to claim 7, wherein the system captures product characteristics including user comments.

9. The system according to claim 1, wherein the system is configured to provide user access to the digital product catalog of products by merchant or site.

10. The system according to claim 1, wherein the system is configured to associate user context information with respective products.

11. A computer implemented method for generating product catalog information, the method comprising:
receiving, by a computer system from at least one monitor, a plurality of tracking communications responsive to a user accessing at least one third party e-commerce site, wherein the at least one monitor is further associated with a plurality of tracking code elements, wherein the plurality of tracking code elements are added to one or more client browser environments or provided to one or more third party online websites, wherein the plurality of tracking code elements are configured to:
capture information responsive to identifying a product being accessed on the at least one third party e-commerce site and further configured to:
capture product characteristics and the product being accessed responsive to identifying the product being accessed, and further configured to:
identify through execution heuristics that a consumer product is being viewed on a web-page, wherein the execution heuristics during execution are configured to evaluate any one or more of the following characteristics to the identify the consumer product:
a largest image displayed on a webpage,
use of location in the displayed page,
content visible at a fold position,
textual treatment of displayed content,
textual symbols including dollar signs displayed,
comparison of prior pages to current page to identify unique content,
known domains and page hierarchy,
thresholds to determine canonical image or secondary image,
embedded product content in a page wherein the embedded product content is displayed outside of a product description page,
page content including user reviews,
multiple products on a page, and
identify one or more site or merchant identifiers for the product being accessed;
identifying, by the computer system, product characteristics from the received plurality of tracking communications;
storing, by the computer system, the product characteristics including at least a site or merchant identifier for each product identified from the product characteristics in a product document, wherein the product document includes a data structure for storing a unique identifier for the product and product characteristics, and wherein the product document data structure further comprises attribute-value pairs describing attributes of the document, wherein at least one attribute-value pair in the data structure defines a relationship between the product and any one or more of: users commenting on the product, shopping for the product, asking questions about the product, and wherein the attribute-value pairs are configured to reference other documents in other repositories, including, references to user documents comprising attribute value-pairs describing the users who accessed the product being tracked; and
generating, independently from the at least one third party e-commerce site and by the computer system, a digital product catalog of products for a plurality of merchants or a plurality of websites responsive to aggregating the plurality of tracking communications.

12. The method according to claim 11, further comprising an act of installing and executing the at least one monitor on a user's local computer system.

13. The method according to claim 12, further comprising:
identifying automatically by the at least one monitor product information from web-sites accessed by the user; and
communicating the product information to the computer system.

14. The method according to claim 12, further comprising identifying and communicating product information from web-sites accessed by the user responsive to user selection.

15. The method according to claim 11, further comprising executing the at least one monitor on the at least one third party e-commerce site.

16. The method according to claim 15, further comprising downloading the at least one monitor to the user's computer system as browser executable code as part of a web page served to the user's computer, wherein executing occurs in response to the user viewing the webpage.

17. The method according to claim 11, further comprising storing the product characteristics as metadata associated with respective products.

18. The method according to claim 17, wherein storing product characteristics includes storing user comments in association with a respective product.

19. The method according to claim 11, further comprising providing user access to the digital product catalog of products by merchant or site.

20. The method according to claim 11, further comprising storing user context information with respective products.

21. The system according to claim 1, wherein the affinity engine is further configured to generate the digital product catalog of products additively.

22. The method according to claim 1, wherein generating the digital product catalog of products includes additively generating the digital product catalog of products for a plurality of merchants or a plurality of websites responsive to aggregating the plurality of tracking communications.

23. The system according to claim 1, wherein the plurality of tracking code elements include javascript executed by a browser, wherein the javascript further comprises plugin elements configured to be injected into the execution logic of the browser, and further configured to:
execute while the browser is running,
identify product displays, and
capture product metadata on the product displays to build descriptive information to be stored in the digital product catalog.

24. The system of claim 1, wherein the plurality of tracking code elements include javascript executed by a browser, wherein the javascript is provided to a plurality of retailers and is inserted into the plurality of retailers' websites, wherein execution of the javascript is triggered responsive to access to products hosted on the plurality of retailers' websites, and wherein the javascript is configured to:
execute while the browser is running,
identify product displays, and
capture product metadata on the product hosted on the plurality of retailers' websites responsive to displays of the hosted products, to build descriptive information to be stored in the digital product catalog.

25. The system of claim 24, wherein the plurality of tracking code elements are embedded in an image rendered in the browser as a pixel, wherein at least one tracking code element is configured to trigger a server request by the browser responsive to loading, wherein the server request is addressed to the affinity system and further configured to deliver the product metadata to the affinity system as a tracking communication.

26. The system of claim 1, wherein the product document data structure includes:
a name for identifying or defining the document,
attribute-value pairs describing attributes of the document,
relationships between products and the users accessing them stored as attribute-value pairs connecting a respective product document to a respective user documents stored in another data repository, wherein the user document defines data structures and attribute-value pair describing attributes of the user who accessed the product.

* * * * *